United States Patent
Ueno

(10) Patent No.: US 8,275,876 B2
(45) Date of Patent: Sep. 25, 2012

(54) METHOD AND APPARATUS FOR COLLECTING ATTRIBUTE-INFORMATION, AND COMPUTER PRODUCT

(75) Inventor: Hitoshi Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1626 days.

(21) Appl. No.: 11/392,911

(22) Filed: Mar. 29, 2006

(65) Prior Publication Data
US 2007/0168526 A1    Jul. 19, 2007

(30) Foreign Application Priority Data
Dec. 21, 2005   (JP) .................................. 2005-368552

(51) Int. Cl.
*G06F 15/173* (2006.01)
(52) U.S. Cl. ........ 709/224; 709/217; 709/219; 709/223; 709/225; 709/226
(58) Field of Classification Search .................. 709/219, 709/223, 224
See application file for complete search history.

(56) References Cited

U.S. PATENT DOCUMENTS
| | | | |
|---|---|---|---|
| 5,978,841 A * | 11/1999 | Berger | 709/217 |
| 6,076,107 A * | 6/2000 | Chen et al. | 709/224 |
| 6,950,864 B1 * | 9/2005 | Tsuchiya | 709/226 |
| 6,954,786 B1 * | 10/2005 | Vered et al. | 709/223 |
| 2002/0035626 A1 | 3/2002 | Higuchi | |

FOREIGN PATENT DOCUMENTS
| | | |
|---|---|---|
| JP | 10-334013 A | 12/1998 |
| JP | 2000-066978 A | 3/2000 |
| JP | 2000-201156 A | 7/2000 |
| JP | 2001-043158 | 2/2001 |
| JP | 2002-101098 A | 4/2002 |
| JP | 2002-297468 | 10/2002 |
| JP | 2004-172651 A | 6/2004 |
| JP | 2004-274289 A | 9/2004 |

OTHER PUBLICATIONS
J. Case et al. "A Simple Network Management Protocol (SNMP)" Network Working Group, May 1990, http://www.ietf.org/rfc/rfc1157.txt.
"Japanese Office Action", mailed by JPO and corresponding to Japanese application No. 2005-368552 on Apr. 27, 2010, with English translation.

* cited by examiner

*Primary Examiner* — Thu Nguyen
*Assistant Examiner* — Nam Tran
(74) *Attorney, Agent, or Firm* — Fujitsu Patent Center

(57) ABSTRACT

An apparatus for collecting attribute information of an information processing apparatus to be monitored in a system for monitoring the information processing apparatus via a network includes an attribute-information obtaining unit that regularly obtains first attribute information from the information processing apparatus to be monitored, and when obtaining the first attribute-information, collectively obtains second attribute information that was obtained subsequent to the first attribute information in past times.

20 Claims, 17 Drawing Sheets

FIG.4

| ATTRIBUTE | ATTRIBUTE VALUE |
|---|---|
| AGING PERIOD | 1000 msec |
| NUMBER OF SIMULTANEOUSLY-OBTAINED OBJECTS | 50 objs |

FIG.5

| APPARATUS ADDRESS | OID | VALUE | REGISTRATION TIME |
|---|---|---|---|
| 10.10.10.1 | 1.3.6.1.2.1.1.4.0 | root | 11:23:34 |
| 10.10.10.1 | 1.3.6.1.2.1.1.5.0 | NE_A | 11:23:34 |
| 10.10.10.1 | 1.3.6.1.2.1.1.6.0 | 5F | 11:23:34 |
| 10.10.30.2 | 1.3.6.1.2.1.1.5.0 | NE_B1 | 10:10:11 |

FIG.6

| APPARATUS ADDRESS | OID | VALUE | REGISTRATION TIME |
|---|---|---|---|
| 10.10.10.1 | 1.3.6.1.2.1.1.4.0 | root | 11:23:34 |
| 10.10.10.1 | 1.3.6.1.2.1.1.5.0 | NE_A | 11:25:10 |
| 10.10.10.1 | 1.3.6.1.2.1.1.6.0 | 5F | 11:25:10 |
| 10.10.10.1 | 1.3.6.1.2.1.1.7.0 | 64 | 11:25:10 |
| 10.10.30.2 | 1.3.6.1.2.1.1.5.0 | NE_B1 | 10:10:11 |

FIG. 8

| APPARATUS ADDRESS | OID | VALUE | REGISTRATION TIME | NUMBER OF TIMES REFERENCE HAS BEEN MADE |
|---|---|---|---|---|
| 10.10.10.1 | 1.3.6.1.2.1.1.4.0 | root | 11:23:34 | 10 |
| 10.10.10.1 | 1.3.6.1.2.1.1.5.0 | NE_A | 11:25:10 | 10 |
| 10.10.10.1 | 1.3.6.1.2.1.1.6.0 | 5F | 11:25:10 | 15 |
| 10.10.10.1 | 1.3.6.1.2.1.1.7.0 | 64 | 11:25:10 | 13 |
| 10.10.30.2 | 1.3.6.1.2.1.1.5.0 | NE_B1 | 10:10:11 | 10 |

FIG.12

| APPARATUS ADDRESS | OID | VALUE | REGISTRATION TIME |
|---|---|---|---|
| 10.10.10.1 | 1.3.6.1.2.2.2.1.1.1 | 1 | 11:23:34 |
| 10.10.10.1 | 1.3.6.1.2.2.2.1.1.2 | 2 | 11:23:34 |
| 10.10.10.1 | 1.3.6.1.2.2.2.1.10.1 | 1001 | 11:23:34 |
| 10.10.10.1 | 1.3.6.1.2.2.2.1.10.2 | 3400 | 11:23:34 |
| 10.10.30.2 | 1.3.6.1.2.1.1.5.0 | NE_B1 | 10:10:11 |

FIG.13

| APPARATUS ADDRESS | OID | VALUE | REGISTRATION TIME |
|---|---|---|---|
| 10.10.10.1 | 1.3.6.1.2.2.2.1.1.1 | 1 | 11:23:34 |
| 10.10.10.1 | 1.3.6.1.2.2.2.1.1.2 | 2 | 11:25:10 |
| 10.10.10.1 | 1.3.6.1.2.2.2.1.1.3 | 3 | 11:25:10 |
| 10.10.10.1 | 1.3.6.1.2.2.2.1.10.1 | 1001 | 11:23:34 |
| 10.10.10.1 | 1.3.6.1.2.2.2.1.10.2 | 3400 | 11:25:10 |
| 10.10.10.1 | 1.3.6.1.2.2.2.1.10.3 | 3091 | 11:25:10 |
| 10.10.30.2 | 1.3.6.1.2.1.1.5.0 | NE_B1 | 10:10:11 |

FIG.15

| APPARATUS ADDRESS | OID | VALUE | REGISTRATION TIME | NUMBER OF TIMES REFERENCE HAS BEEN MADE |
|---|---|---|---|---|
| 10.10.10.1 | 1.3.6.1.2.2.2.1.1.1 | 1 | 11:23:34 | 10 |
| 10.10.10.1 | 1.3.6.1.2.2.2.1.1.2 | 2 | 11:23:34 | 15 |
| 10.10.10.1 | 1.3.6.1.2.2.2.1.10.1 | 1001 | 11:23:34 | 10 |
| 10.10.10.1 | 1.3.6.1.2.2.2.1.10.2 | 3400 | 11:23:34 | 15 |
| 10.10.30.2 | 1.3.6.1.2.1.1.5.0 | NE_B1 | 10:10:11 | 3 |

FIG.17

| GROUP ID | OID |
|---|---|
| 1 | 1.3.6.1.2.2.2.1.1 |
| 1 | 1.3.6.1.2.1.4.20.1 |
| 1 | 1.3.6.1.2.1.10.23.1.1.1 |
| 2 | 1.3.6.1.2.1.55.1.6.1 |
| 2 | 1.3.6.1.2.1.55.1.7.1 |

FIG.18

| APPARATUS ADDRESS | OID | VALUE | REGISTRATION TIME |
|---|---|---|---|
| 10.10.10.1 | 1.3.6.1.2.2.2.1.1.1 | 1 | 11:25:10 |
| 10.10.10.1 | 1.3.6.1.2.2.2.1.1.2 | 2 | 11:25:10 |
| 10.10.10.1 | 1.3.6.1.2.2.2.1.1.3 | 3 | 11:25:10 |
| 10.10.10.1 | 1.3.6.1.2.2.2.1.10.1 | 1001 | 11:25:10 |
| 10.10.10.1 | 1.3.6.1.2.2.2.1.10.2 | 3400 | 11:25:10 |
| 10.10.10.1 | 1.3.6.1.2.2.2.1.10.3 | 3091 | 11:25:10 |
| 10.10.10.1 | 1.3.6.1.2.1.4.20.1.1 | 192. 168. 0. 5 | 11:25:10 |
| 10.10.10.1 | 1.3.6.1.2.1.4.20.1.2 | 192. 168. 0. 5 | 11:25:10 |
| 10.10.10.1 | 1.3.6.1.2.1.4.20.1.3 | 192. 168. 0. 5 | 11:25:10 |
| 10.10.30.2 | 1.3.6.1.2.1.1.5.0 | NE_B1 | 10:10:11 |

FIG.20
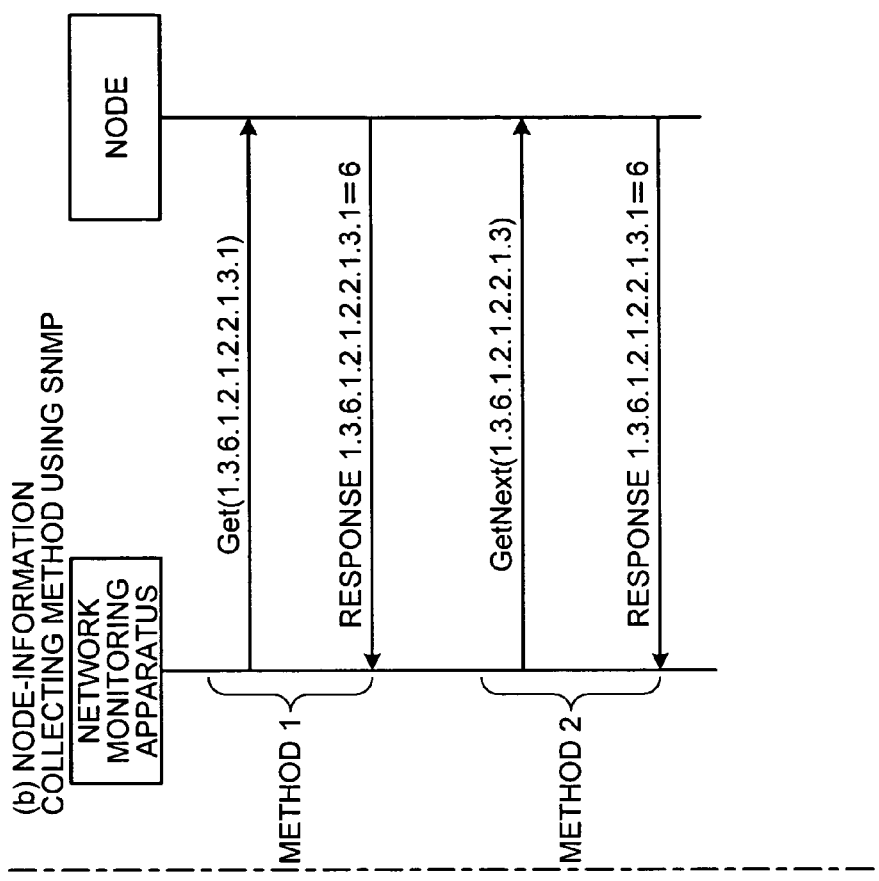
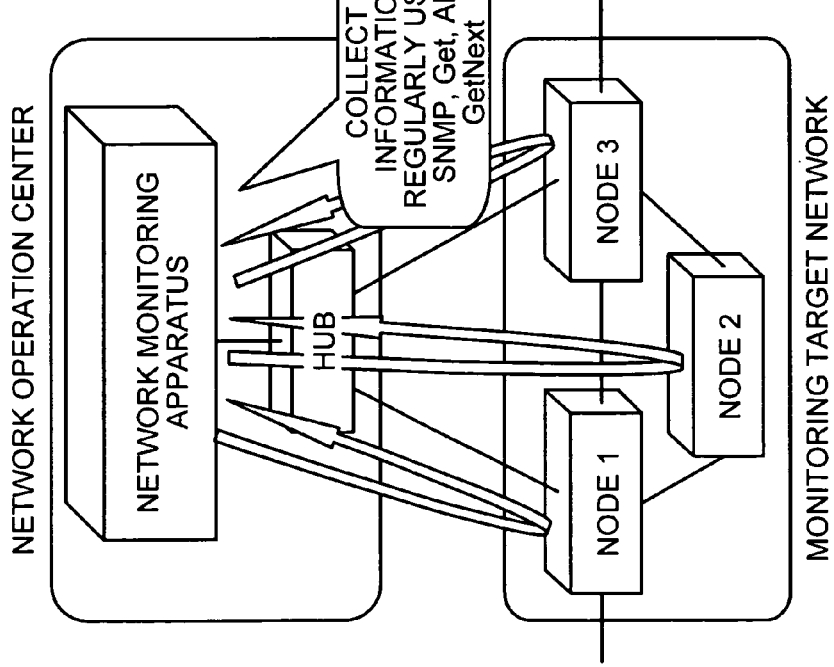

METHOD AND APPARATUS FOR COLLECTING ATTRIBUTE-INFORMATION, AND COMPUTER PRODUCT

BACKGROUND OF THE PRESENT INVENTION

1. Field of the Present Invention

The present invention relates to a technology for collecting attribute-information of an information processing apparatus to be monitored in a system for monitoring the information processing apparatus via a network.

2. Description of the Related Art

Conventionally, a system for monitoring an information processing apparatus via a network, such as a network monitoring system or a server monitoring system, obtains a name or an identifier of a management attribute installed in the monitoring system in advance or set by a system administrator from an apparatus, such as a communication apparatus or an information terminal to be monitored (hereinafter, "node"), using a protocol for monitoring the network, and judges whether the attribute value is valid (e.g. whether the attribute value does not exceed a threshold value) or identifies points of failure.

A widely-used example of the protocol for monitoring the network, which is used by the network monitoring system, is a simple network management protocol (SNMP). The SNMP is a protocol that allows a network monitoring system to collect information from a node being a monitoring target and to change the setting of each of the nodes (see, for example, J. Case, M. Fedor, M. Schoffstall, J. Davin, "A simple Network Management Protocol (SNMP)", [online], May 1990, [retrieved on 19 Nov. 2005].

With the SNMP, information of nodes is managed in units called objects. Each of the objects stores therein an attribute value that corresponds to the attribute of the object. The objects are classified, according to the type of each object, into a plurality of type groups that are hierarchized. Also, each of the objects is identified-using an identifier called an object ID (hereinafter "OID"). An OID is made up of values connected by periods "." that correspond to hierarchy levels, and different values are assigned to different type groups and different objects.

The SNMP uses a concept called "tables" which are used for managing a plurality of objects of the same type within a type group. A table includes a plurality of groups called entries each of which is made up of a plurality of predetermined objects. The number of entries included in a table depends on each of the nodes and may increase or decrease with changes in the hardware configuration. To each of the entries, an index for identifying the entry is assigned. Each of the objects belonging to an entry is identified by an index added to the OID so that it can be recognized to which entry each of the objects belongs. It is determined for each of the type groups whether the objects are managed in the table format.

For example, the OID of a sysName object, which denotes the name of the apparatus itself, is expressed as "1.3.6.1.2.1.1.5.0". A set of the first seven numerals "1.3.6.1.2.1.1" denotes a "System" group that classifies the information related to the apparatus itself. The following numeral "5" denotes the sysName object. The last numeral "0" is an index for further classifying the sysName object. When the index is "0", it means that this object is not expressed in the table format and that this object is the only object in the apparatus.

As another example, the OID of an ifErrors object, which denotes the number of packets that had errors in each of the interfaces included in an apparatus, is expressed as "1.3.6.1.2.1.2.2.1.14.n". A set of the first seven numerals "1.3.6.1.2.1.2" denotes an "Interface" group that classifies the information related to the interface. The following numeral "14" denotes the ifErrors object. The last letter "n" is an index for further classifying the ifErrors object. For example, when the "ifIndex" of Port No. 5 is "5", the number of packets that had errors in Port No. 5 can be expressed by changing "n" to "5".

FIG. 20 is a schematic for illustrating a network monitoring system and a node-information collecting method using the SNMP according to a conventional technology. In the network monitoring system, the network monitoring apparatus regularly collects node information from each of the nodes connected to the network being the monitoring target, using a Get command or a GetNext command defined by the SNMP for the purpose of collecting information.

The Get command is a command for specifying an OID of the object to be obtained so as to notify the node and obtaining the specified OID and an attribute value of the object identified with the OID. The GetNext command is a command for specifying an OID so as to notify the node and obtaining an OID that is subsequent to the specified OID in the lexical order and an attribute value of the object identified with the subsequent OID.

For example, as shown in Method 1 in FIG. 20, when a Get command is executed with the OID "1.3.6.1.2.1.2.2.1.3.1" being specified, the node returns the OID "1.3.6.1.2.1.2.2.1.3.1" and its attribute value "6". As another example, as shown in Method 2 in FIG. 20, when a GetNext command is issued with the OID "1.3.6.1.2.1.2.2.1.3" being specified, the node returns the OID "1.3.6.1.2.1.2.2.1.3.1" and its attribute value "6".

To provide further information, as for objects that are managed in the table format, because the number of entries included in a table depends on each of the nodes, the network monitoring apparatus is not able to recognize the OIDs in advance. Consequently, when an attribute value of such an object is to be obtained, it is not possible to obtain attribute values of all the objects using a Get command, because a Get command requires that the OIDs be specified directly. Thus, attribute values of unknown objects are obtained by sequentially and repeatedly obtaining an OID that is subsequent to an OID specified as a reference, using a GetNext command.

FIG. 21 is a schematic for explaining how node information is collected using a GetNext command. For example, the network monitoring apparatus executes a GetNext command by specifying the OID "1.3.6.1.2.1.2.2.1.3", and thus obtains the OID "1.3.6.1.2.1.2.2.1.3.1" and its attribute value "6". Subsequently, the network monitoring apparatus executes a GetNext command by specifying the obtained OID "1.3.6.1.2.1.2.2.1.3.1", and thus obtains the OID "1.3.6.1.2.1.2.2.1.3.5" and its attribute value 6. Further, the network monitoring apparatus executes a GetNext command by specifying the obtained OID "1.3.6.1.2.1.2.2.1.3.5" and, and thus obtains the OID "1.3.6.1.2.1.2.2.1.3.7" and its attribute value "6".

With the arrangements of the node-information collecting method according to the conventional technique, which takes it into account that OIDs change depending on the configurations and the state of the nodes, because each of the GetNext commands is executed by sequentially specifying an OID at a time, the network monitoring apparatus and the network being the monitoring target need to communicate with each other every time the command is executed. The problems with this conventional method are that a load to the monitoring target network is increased and that the processing time required for collecting the apparatus information is long.

SUMMARY OF THE PRESENT INVENTION

It is an object of the present invention to at least solve the problems in the conventional technology.

An apparatus according to one aspect of the present invention is for collecting attribute information of an information processing apparatus to be monitored in a system for monitoring the information processing apparatus via a network. The apparatus includes an attribute-information obtaining unit that regularly obtains first attribute information from the information processing apparatus to be monitored, and when obtaining the first attribute information, collectively obtains second attribute information that was obtained subsequent to the first attribute information in past times.

A method according to another aspect of the present invention is for collecting attribute information of an information processing apparatus to be monitored in a system for monitoring the information processing apparatus via a network. The method includes attribute-information obtaining including obtaining regularly first attribute information from the information processing apparatus to be monitored; and obtaining collectively, when obtaining the first attribute information, second attribute information that was obtained subsequent to the first attribute information in past times.

A computer-readable recording medium according to still another aspect of the present invention stores a computer program for collecting attribute information of an information processing apparatus to be monitored in a system for monitoring the information processing apparatus via a network. The computer program causes a computer to execute attribute-information obtaining including obtaining regularly first attribute information from the information processing apparatus to be monitored; and obtaining collectively, when obtaining the first attribute information, second attribute information that was obtained subsequent to the first attribute information in past times.

The above and other objects, features, advantages and technical and industrial significance of this invention will be better understood by reading the following detailed description of presently preferred embodiments of the present invention, when considered in connection with the accompanying drawings.

BRIEF DESCRIPTION OF THE DRAWINGS

FIG. 4 is a table of an example data configuration of a basic-information storing unit according to the first embodiment;

FIG. 5 is a table of an example of data configuration of a node-information storing unit according to the first embodiment;

FIG. 6 is a table of an example of data configuration of the node-information storing unit after an update according to the first embodiment;

FIG. 8 is a table of an example of data configuration of the node-information storing unit to which the number of times of reference is added, according to the first embodiment;

FIG. 12 is a table of an example of data configuration of a node-information storing unit according to the second embodiment;

FIG. 13 is a table of an example of data configuration of the node-information storing unit after an update according to the second embodiment;

FIG. 15 is a table of an example of data configuration of the node-information storing unit to which the number of times of reference is added, according to the second embodiment;

FIG. 17 is a table of an example of data configuration of an identical-change-group storing unit according to the third embodiment;

FIG. 18 is a table of an example of data configuration of a node-information storing unit after an update according to the third embodiment;

FIG. 20 is a schematic for illustrating a network monitoring system and a node-information collecting method using the SNMP according to a conventional technology.

DETAILED DESCRIPTION OF THE PREFERRED EMBODIMENTS

Exemplary embodiments of the present invention will be explained in detail below with reference to the accompanying drawings.

Figure 1:
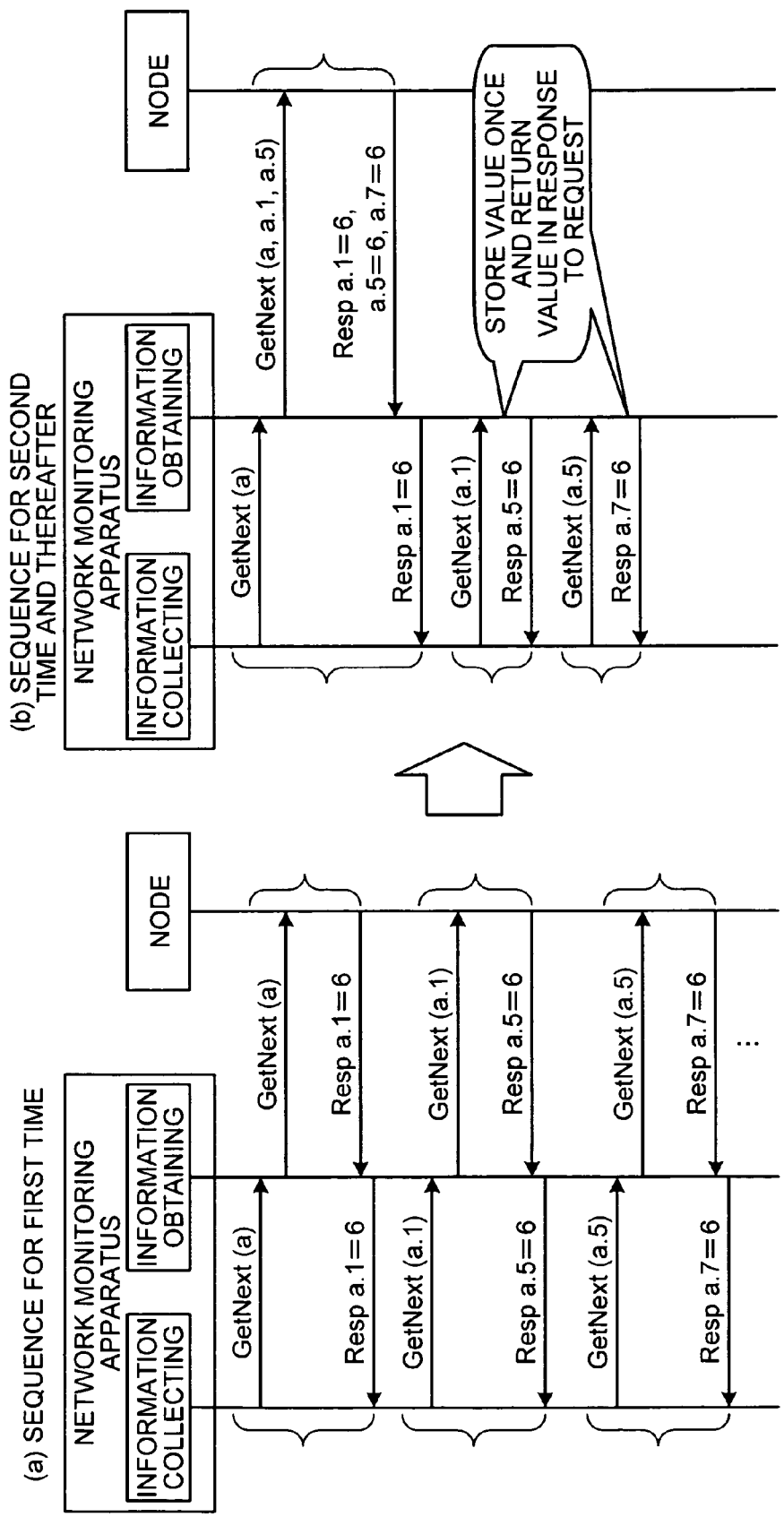
FIG. 1 is a schematic for explaining a node-information collecting method used by a network monitoring apparatus according to a first embodiment of the present invention.

FIG. 1 is a schematic for explaining a node-information collecting method used by a network monitoring apparatus according to a first embodiment of the present invention. The network monitoring apparatus obtains object information (including an OID and an attribute value) from a node being a monitoring target, using information collecting commands (i.e. Get commands and GetNext commands) that are defined by the SNMP.

The network monitoring apparatus includes a node-information collecting unit that regularly issues an information collecting command for collecting object information from a monitoring target node and a node-information obtaining unit that obtains the object information from the monitoring target node in response to the information collecting command issued by the node-information collecting unit.

The node-information collecting unit regularly performs a node-information collecting processing in which a plurality of information collecting commands is sequentially issued. In each of these information collecting commands that are issued, an apparatus address for identifying the node from which the information is to be collected and an OID (an object ID) for identifying the object to be collected are specified.

In a node-information collecting processing for the first time, the node-information obtaining unit-sends an information collecting command to a node specified as a receiver of the information collecting command, obtains a piece of object information, and sends the piece of object information to the node-information collecting unit. Further, the node-information obtaining unit sequentially receives more information collecting commands and obtains more pieces of object information, and then sequentially sends the pieces of object information to the node-information collecting unit.

In the node-information collecting processing for the first time, the node-information obtaining unit sequentially stores therein the pieces of object information obtained from the node. In the node-information collecting processing for the second time and thereafter, when having received an information collecting command from the node-information collecting unit, the node-information obtaining unit extracts a predetermined number (the predetermined number being called "the number of simultaneously-obtained objects") of OIDs that are speculated to be sequentially received subsequently, out of the OIDs of the pieces of object information being stored and obtains pieces of object information by collectively specifying the extracted OIDs together.

When having sequentially received information collecting commands, the node-information obtaining unit sequentially sends pieces of object information that, out of the pieces of object information that have already been obtained, correspond to the specified OIDs, to the node-information collecting unit.

With reference to the example shown in FIG. 1, in the node-information collecting processing for the first time, when the node-information collecting unit sends a GetNext command to the node-information obtaining unit by specifying the OID "a", the node-information obtaining unit sends the GetNext command to the node being the target. Subsequently, the node-information obtaining unit sends the OID "a.1" and its attribute value "6" that are sent as a response, to the node-information collecting unit.

When the node-information collecting unit sends a GetNext command to the node-information obtaining unit by specifying the OID "a.1", the node-information obtaining unit sends the GetNext command to the node being the target. Subsequently, the node-information obtaining unit sends the OID "a.5" and its attribute value "6" that are sent as a response, to the node-information collecting unit.

When the node-information collecting unit sends a GetNext command to the node-information obtaining unit by specifying the OID "a.5", the node-information obtaining unit sends the GetNext command to the node being the target. Subsequently, the node-information obtaining unit sends the OID "a.7" and its attribute value "6" that are sent as a response, to the node-information collecting unit.

In the node-information collecting processing for the first time, the node-information obtaining unit stores therein the OIDs "a.1", "a.5", and "a.7" and their attribute values "6", "6", and "6" that are sent as responses.

In the node information collcting collecting processing for the second time and thereafter, when the node-information collecting unit sends a GetNext command to the node-information obtaining unit by specifying the OID "a", the node-information obtaining unit extracts the OIDs "a.1" and "a.5" that are speculated to be sequentially received subsequent to the specified OID "a" (in this example, the predetermined number of simultaneously-obtained objects is 2), out of the OIDs of the pieces of object information being stored, and obtains the OIDs "a.1", "a.5", and "a.7" and their attribute values "6", "6", and "6" by collectively specifying the OIDs "a", "a.1" and "a.5".

The node-information obtaining unit then sends the OID "a.1" that corresponds to the specified OID "a" and the attribute value of the OID "a.1", namely "6", to the node-information collecting unit.

When the node-information collecting unit sends a GetNext command to the node-information obtaining unit by specifying the OID. "a.1", the node-information obtaining unit sends, according to the GetNext command, the OID "a.5" and its attribute value "6", out of the pieces of object information that have already been obtained, to the node-information collecting unit.

When the node-information collecting unit sends a GetNext command to the node-information obtaining unit by specifying the OID "a.5", the node-information obtaining unit sends, according to the GetNext command, the OID "a.7" and its attribute value "6", out of the pieces of object information that have already been obtained, to the node-information collecting unit.

Figure 2:
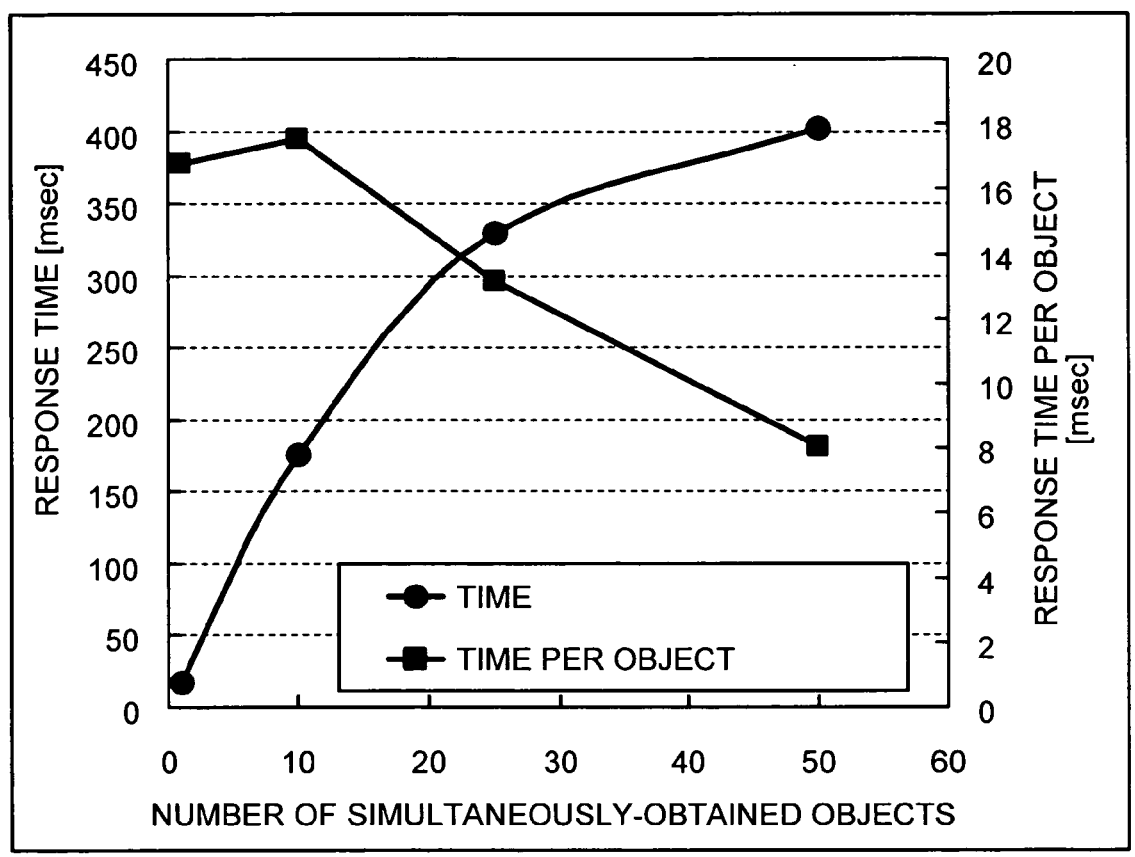
FIG. 2 is a graph of a relationship between the number of simultaneously-obtained objects and the response time.

FIG. 2 is a graph of a relationship between the number of simultaneously-obtained objects and the response time. When the number of objects simultaneously obtained in a one-time communication in response to an information collecting command is increased, the response time for each object becomes shorter.

As explained above, with the arrangements of the network monitoring apparatus according to the first embodiment, when object information is regularly obtained from a monitoring target node, pieces of object information that are obtained subsequent to a specified piece of object information in the past are collectively obtained at the same time. Thus, it is possible to reduce the number of times of communication made between the network monitoring apparatus and the monitoring target node. Accordingly, it is possible to reduce the load to the monitoring target network and also to shorten the processing time required for the collection of the object information.

Figure 3:
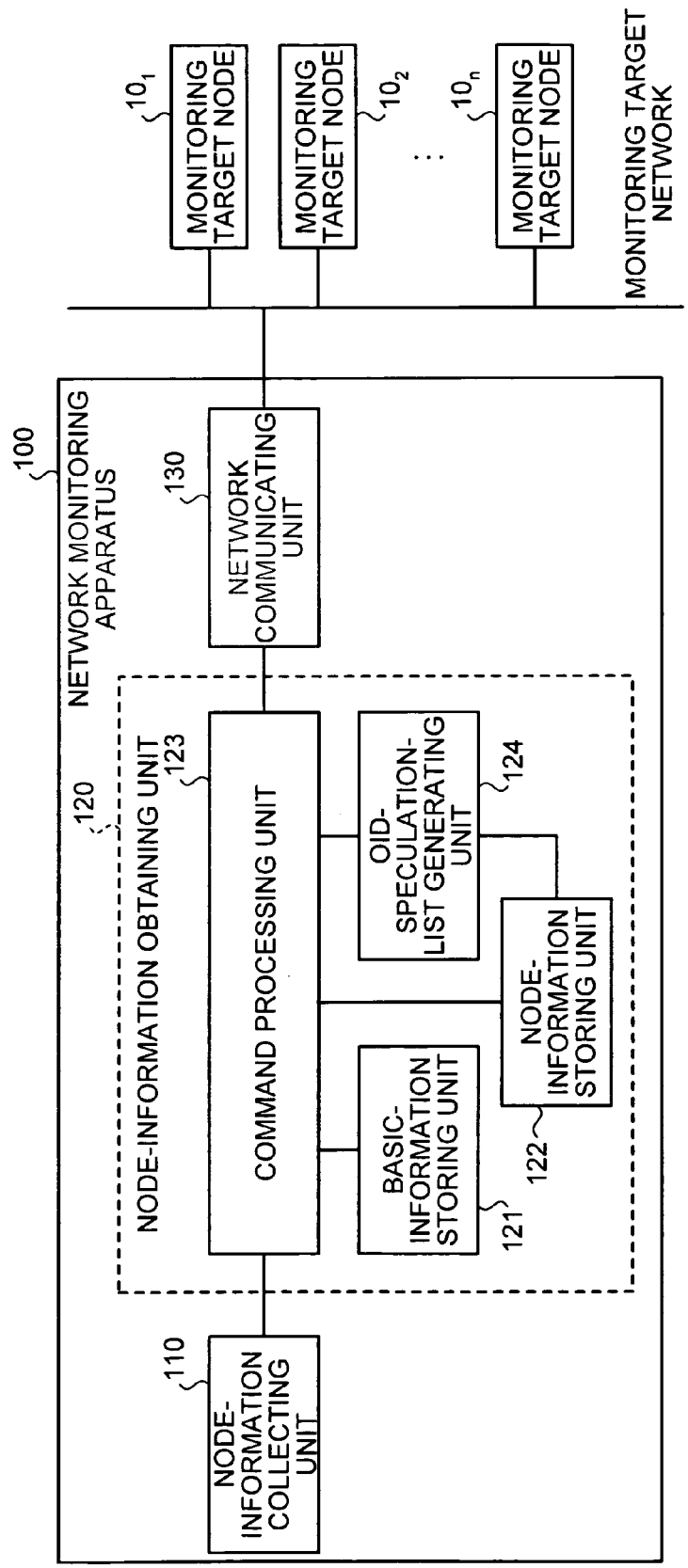
FIG. 3 is a block diagram of a network monitoring apparatus according to the first embodiment.

FIG. 3 is a block diagram of a network monitoring apparatus 100 according to the first embodiment. The network monitoring apparatus 100 is connected to monitoring target nodes $10_1$ to $10_n$ via a monitoring target network.

The network monitoring apparatus 100 is an apparatus that regularly collects, using the SNMP, object information (node information) from the monitoring target nodes $10_1$ to $10_n$ that are connected to the monitoring target network, the object information indicating the state of each of the nodes, and also detects failures, if the network has any, by checking the attribute values included in the object information. The network monitoring apparatus 100 includes a node-information collecting unit 110, a node-information obtaining unit 120, and a network communicating unit 130.

The node-information collecting unit 110 is a processing unit that regularly collects the object information from the monitoring target nodes $10_1$ to $10_n$ To be more specific, the node-information collecting unit 110 regularly performs a node-information collecting processing for collecting the object information from the monitoring target nodes $10_1$ to $10_n$. In the node-information collecting processing, each time the processing is performed, a plurality of information collecting commands (Get commands and GetNext commands) are sequentially sent to the node-information obtaining unit 120. When the information collecting command is sent, an apparatus address for identifying a node and an OID for identifying an object are specified. The node-information collecting unit 110 collects the object information of the monitoring target nodes $10_1$ to $10_n$ by receiving the object information sent, as a response, from the node-information obtaining unit 120 according to the information collecting command.

The network communicating unit 130 is a processing unit that communicates with the monitoring target nodes $10_1$ to $10_n$ via the monitoring target network. To be more specific, when having received a node-information collecting command from the node-information obtaining unit 120, the network communicating unit 130 sends the node-information collecting command to the specified one of the monitoring target nodes $10_1$ to $10_n$ via the monitoring target network. The network communicating unit 130 then returns the object information, which is sent from the specified node as a response, to a command processing unit 123.

The node-information obtaining unit 120 is a processing unit that sends, as a response, object information according to an information collecting command sent by the node-information collecting unit 110. The node-information obtaining unit 120 includes a basic-information storing unit 121, a node-information storing unit 122, the command processing unit 123, and an OID-speculation-list generating unit 124.

The basic-information storing unit 121 is a storing unit that stores therein an aging period that defines a period of validity for the object information stored in the node-information storing unit 122 and the number of simultaneously-obtained objects that defines an upper limit of the number of objects when a plurality of pieces of object information are collectively obtained from each of the monitoring target nodes $10_1$ to $10_n$. FIG. 4 is a table of an example data configuration of the basic-information storing unit 121. In the example shown in this drawing, the aging period is set at 1000 milliseconds (msec) and the number of simultaneously-obtained objects is set at 50 objects (objs).

The node-information storing unit 122 is a storing unit that stores therein object information obtained from the monitoring target nodes $10_1$ to $10_n$ by the command processing unit 123. FIG. 5 is a table of an example of data configuration of the node-information storing unit 122. As shown in the drawing, the node-information storing unit 122 stores therein apparatus addresses for identifying nodes, OIDs for identifying objects, values indicating attribute values of the objects, and registration times at each of which a different one of the pieces of object information has been registered.

The command processing unit 123 is a processing unit that sends, as a response, object information according to an information collecting command sent by the node-information collecting unit 110. To be more specific, in a node-information collecting processing for the first time, when having received an information collecting command from the node-information collecting unit 110, the command processing unit 123 sends the information collecting command to the network communicating unit 130. Subsequently, the command processing unit 123 sends, as a response, the object information that is returned as a result, to the node-information collecting unit 110.

Every time a piece of object information is sent from one of the monitoring target nodes $10_1$ to $10_n$ as a response, the command processing unit 123 stores the piece of object information to the node-information storing unit 122. In a node-information collecting processing for the second time and thereafter, when having received an information collecting command from the node-information collecting unit 110, the command processing unit 123 checks to see if information of the object corresponding to the received information collecting command is stored in the node-information storing unit 122 and, when the information is stored, the command processing unit 123 sends, as a response, the object information to the node-information collecting unit 110.

On the other hand, when no object information corresponding to the information collecting command received from the node-information collecting unit 110 is stored in the node-information storing unit 122, the command processing unit 123 sends, just like in the node-information collecting processing for the first time, the information collecting command to the network communicating unit 130. The command processing unit 123 then sends the object information, which is returned as a result, to the node-information collecting unit 110 and also stores the object information into the node-information storing unit 122.

Even if the object information corresponding to the received information collecting command is stored in the node-information storing unit 122, the command processing unit 123 calculates an elapsed period of time between the registration time of the object information and the current point in time, and when the elapsed period of time exceeds the aging period stored in the basic-information storing unit 121, the command processing unit 123 judges that there is a possibility that the object information has already changed in the monitored network and sends the information collecting command to the network communicating unit 130.

On such an occasion, the command processing unit 123 sends the apparatus address and the OID that are specified in the information collecting command received from the node-information collecting unit 110, and also the number of simultaneously-obtained objects obtained from the basic-information storing unit 121, to the OID-speculation-list generating unit 124. Based on the apparatus address, the OID, and the number of simultaneously-obtained objects that have been sent, the OID-speculation-list generating unit 124 sends, as a response, a list of OIDs that are speculated to be requested, subsequent to the specified OID, by the node-information collecting unit 110. The processing performed by the OID-speculation-list generating unit 124 will be described later.

When having obtained the list of OIDs from the OID-speculation-list generating unit 124, the command processing unit 123 sends a single node-information collecting command by collectively specifying the OIDs in the list. The command processing unit 123 then stores the object information, which is sent as a response from the network communicating unit 130, into the node-information storing unit 122.

FIG. 6 is a table of an example of data configuration of the node-information storing unit 122 after an update. When the node-information collecting unit 110 specifies the OID "1.3.6.1.2.1.1" using a GetNext command, the OID-speculation-list generating unit 124 generates a list of OIDs including "1.3.6.1.2.1.1.4.0", "1.3.6.1.2.1.1.5.0", and "1.3.6.1.2.1.1.6.0". As a result of a GetNext command in which the generated list is specified, the object information for the OIDs "1.3.6.1.2.1.1.5.0", "1.3.6.1.2.1.1.6.0", and "1.3.6.1.2.1.1.7.0" are obtained. The example shown in FIG. 6 shows the state after the result of this procedure is reflected onto the example shown in FIG. 5. In the example shown in FIG. 6, the registration times in the object information for the OIDs "1.3.6.1.2.1.1.5.0" and "1.3.6.1.2.1.1.6.0" has been updated, and the object information for the OID "1.3.6.1.2.1.1.7.0" has been newly added.

To provide further information, with the SNMP, when a node-information collecting command is sent by specifying a plurality of OIDs, if the size of the data to be sent in response to the node-information collecting command exceeds a predetermined limit, an error (called tooBig error) will be returned. When having received a tooBig error, the command processing unit 123 reduces the number of OIDs specified to the half and sends a node-information collecting command again.

When having received an error from one of the monitoring target nodes 101 to 10n as a result of an attempt to obtain object information by collectively specifying a plurality of OIDs, the error indicating that the size of the object information to be sent as a response is too big, the command processing unit 123 makes another attempt to obtain the object information from the one of the monitoring target nodes 101 to 10n by specifying a reduced number of OIDs. Consequently, the network monitoring apparatus 100 is able to reduce the number of errors that are caused because the size of object information sent as a response is too big. Thus, it is possible to shorten the processing time required for the collection of the object information.

It should be noted that, although the example in which the number of OIDs specified in the list is reduced to the half is explained above, the present invention is not limited to this example, and it is acceptable to use any other subtraction algorithm that is determined in advance.

Further, during a sequence of the node-information collecting processing, when an error indicating that there is no corresponding OID is returned in response to a node-information collecting command that has been sent, the command processing unit 123 deletes the object information related to the specified node from the node-information storing unit 122.

When the command processing unit 123 has received an error from one of the monitoring target nodes 101 to 10n as a result of an attempt to obtain the object information by specifying an OID, the error indicating that there is no OID that corresponds to the specified OID, the command processing unit 123 deletes the object information identified with the OID from the node-information storing unit 122. Consequently, the network monitoring apparatus 100 is able to eliminate the unnecessary processing to try to obtain object information that is not held by the nodes $10_1$ to $10_n$. Thus, it is possible to reduce the load to the monitoring target network and also to shorten the processing time required for the collection of the object information.

The OID-speculation-list generating unit 124 is a processing unit that generates a list of OIDs that are speculated to be requested subsequent to an OID received from the command processing unit 123, based on the object information stored in the node-information storing unit 122. To be more specific, when having received an apparatus address, an OID, and the number of simultaneously-obtained objects from the command processing unit 123, the OID-speculation-list generating unit 124 extracts one or more OIDs each of which includes the received OID in the manner of a prefix search, out of the object information stored in the node-information storing unit 122, and generates a list of OIDs. The upper limit for the number of OIDs to be included in the generated list is the number of simultaneously-obtained objects sent from the command processing unit 123. The OID-speculation-list generating unit 124 sends the generated list of OIDs to the command processing unit 123.

In this example, the requested OID is used as a reference so that the list of OIDs is generated using the extracted one or more OIDs each of which includes the requested OID in the manner of a prefix search. The reason for this procedure is because, generally speaking, when node information is collected in a network monitoring process, information of mutually related objects is often obtained sequentially. In other words, by using the method described above, it is possible to speculate one or more OIDs that are likely to be requested subsequent to the specified OID.

Figure 7:
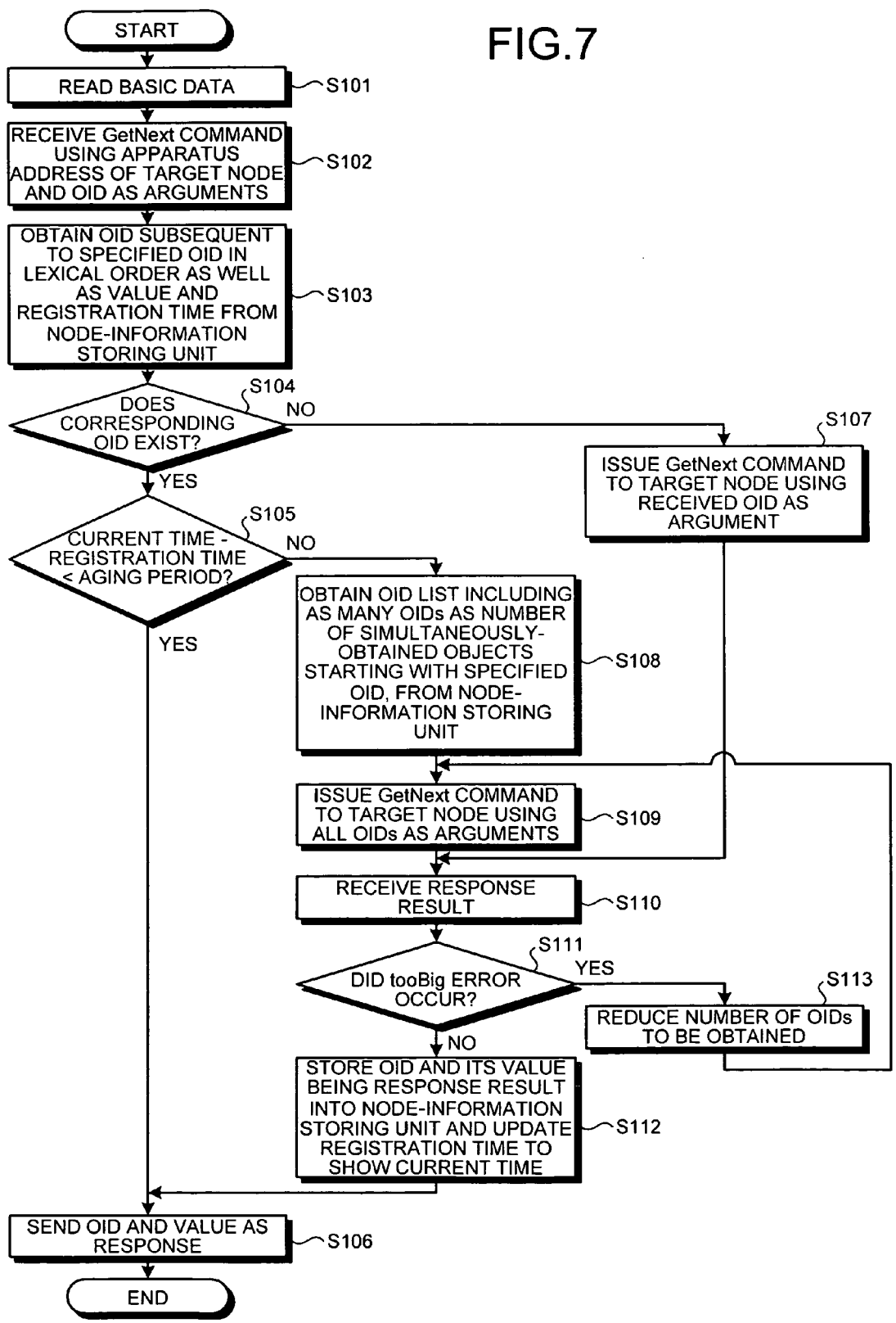
FIG. 7 is a flowchart of a processing procedure for a node-information collecting process performed by the network monitoring apparatus according to the first embodiment.

FIG. 7 is a flowchart of a processing procedure for a node-information collecting process performed by the network monitoring apparatus 100. In the following section, an example in which a GetNext command is used as a node-information collecting command will be explained.

As shown in the drawing, within the network monitoring apparatus 100, the command processing unit 123 reads the aging period and the number of simultaneously-obtained objects from the basic-information storing unit 121 (step S101).

When the node-information collecting unit 110 sends a GetNext command by specifying an apparatus address and an OID, the command processing unit 123 receives the command (step S102) and obtains, out of the node-information storing unit 122, an OID, an attribute value, and a registration time of a piece of object information identified with the OID that is subsequent to the specified OID in the lexical order (step S103 and step S104: Yes).

The command processing unit 123 calculates an elapsed period of time between the obtained registration time and the current point in time. When the elapsed period of time does not exceed the aging period obtained from the basic-information storing unit 121 (step S105: Yes), the command processing unit 123 sends, as a response, the OID and the attribute value obtained from the node-information storing unit 122 to the node-information collecting unit 110 (step S106).

On the other hand, when no object information that corresponds to the specified apparatus address and OID is stored in the node-information storing unit 122 (step S104: No), the command processing unit 123 sends a GetNext command to the network communicating unit 130 by specifying the apparatus address and the OID (step S107). The network communicating unit 130 sends the received GetNext command to the specified node.

When the elapsed period of time between the obtained registration time and the current point in time exceeds the aging period obtained from the basic-information storing unit 121 (step S105: No), the OID-speculation-list generating unit 124 generates a list of OIDs (Step S108). The command processing unit 123 sends a GetNext command to the network communicating unit 130 by specifying the list of OIDs (step S109).

The network communicating unit 130 sends the GetNext command received from the command processing unit 123 to the node identified with the specified apparatus address, and returns the object information, which is sent as a response as a result, to the command processing unit 123 (step S110).

When a tooBig error is sent as a response as the result (step S111: Yes), the command processing unit 123 reduces the number of OIDs specified (step S113) and sends a GetNext command to the network communicating unit 130 again.

Conversely, no tooBig error is sent as a response as the result (step S111: No), the command processing unit 123 stores the OID and the attribute value that have been sent as a response into the node-information storing unit 122 and updates the registration time to show the current time at that point in time (step S112). As a result, if an error is sent, as a response, indicating that there is no object corresponding to the specified OID, the command processing unit 123 deletes the object information related to the specified node from the node-information storing unit 122.

The command processing unit 123 then sends, as a response, the object information that has been sent during the sequence of node-information collecting processing to the node-information collecting unit 110 (step S106).

As explained above, with the arrangements of the network monitoring apparatus 100 according to the first embodiment, when attribute information is regularly obtained from the monitoring target nodes $10_1$ to $10_n$ by specifying an OID, the object information is obtained by collectively specifying, at the same time, also the OIDs that were specified subsequent to the specified OID in the past. Thus, it is possible to reduce the number of times of communication made between the network monitoring apparatus 100 and the monitoring target nodes $10_1$ to $10_n$. Accordingly, it is possible to reduce the load to the monitoring target network and also to shorten the processing time required for the collection of the object information.

According to the first embodiment, the OID-speculation-list generating unit 124 extracts the OIDs from the node-information storing unit 122 using the number of simultaneously-obtained objects stored in the basic-information storing unit 121 as the upper limit and generates the list of OIDs; however, another arrangement is acceptable in which, when extracting the OIDs, the OID-speculation-list generating unit 124 extracts OIDs by giving a higher priority to the OIDs that have more frequently been obtained than others in the past.

FIG. 8 is a table of an example of data configuration of the node-information storing unit 122 to which the number of times of reference is added. In this example, as shown in the drawing, the number of times reference has been made is added to the object information stored in the node-information storing unit 122. The number of times reference has been made is counted up every time the object information is updated. The OID-speculation-list generating unit 124 extracts OIDs by giving a higher priority to the OIDs that have, as the number of times reference has been made, a larger number than others.

As explained above, with the arrangements of the network monitoring apparatus 100 according to the first embodiment, the node-information storing unit 122 further stores therein, for each of the pieces of object information, the number of times reference has been made indicating how many times each piece of object information has been obtained from the monitoring target nodes $10_1$ to $10_n$. The OID-speculation-list generating unit 124 extracts, from the node-information storing unit 122, OIDs by giving a higher priority to the OIDs that have, as the number of times reference has been made, a larger number than others. The command processing unit 123 obtains the object information by collectively specifying, at the same time, also the extracted OIDs. Thus, it is possible to reduce the number of times of communication made between the network monitoring apparatus 100 and the monitoring target nodes $10_1$ to $10_n$. Accordingly, it is possible to reduce the load to the monitoring target network and also to shorten the processing time required for the collection of the object information.

According to the first embodiment, the example has been explained in which the command processing unit 123 overwrites the data in, or add new data to, the node-information storing unit 122, using the object information that has been sent from a specified one of the monitoring target nodes $10_1$ to $10_n$ to as a response. However, another arrangement is also acceptable in which the node-information storing unit 122 is optimized by deletion of unnecessary object information, as a result of a comparison between a list of OIDs generated based on the node-information storing unit 122 and the OIDs that have been sent as a response.

To describe a first example of the method used in such an arrangement, as a result of a comparison between the list of OIDs generated based on the node-information storing unit 122 and the OIDs that have been sent as a response, if an OID that is not stored in the node-information storing unit 122 has been sent as a response, pieces of object information for the OID subsequent to the missing OID and for the OIDs thereafter will be once deleted from the node-information storing unit 122 because there is a possibility that the pieces of object information for the OID subsequent to the missing OID and for the OIDs thereafter have not been obtained.

With this arrangement, the object information that has a possibility of not having been obtained will be obtained in the next processing or later. Thus, it is possible to optimize the node-information storing unit 122 according to the state of the monitoring target nodes $10_1$ to $10_n$ at the particular point in time.

Figure 9:
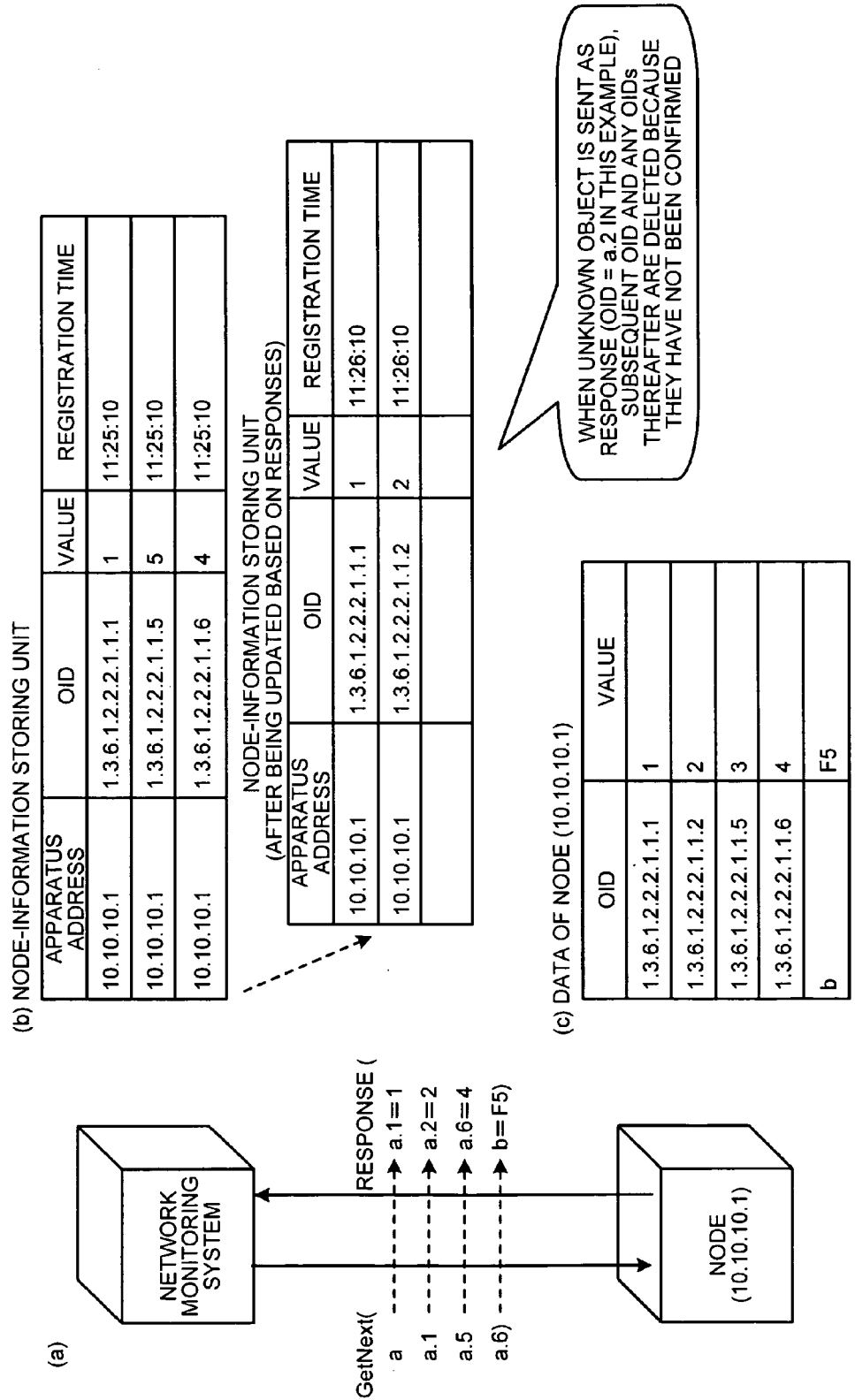
FIG. 9 is a schematic for explaining an update of the node-information storing unit when unknown node information is obtained.

FIG. 9 is a schematic for explaining an update of the node-information storing unit 122 when unknown node information is obtained. For example, when a GetNext command is sent to a node (of which the apparatus address is "10.10.10.1") having object information as shown in FIG. 9, by specifying "a", "a.1", "a.5", and "a.6" (where "a"="1.3.6.1.2.2.2.1.1") out of a list of OIDs generated based on the node-information storing unit 122 shown in FIG. 9, the OIDs "a.1", "a.2", "a.6", and "b" will be sent as a response.

As we compare the OIDs sent as a response with the specified OIDs, it is observed that "a.2", which was not included in the specified OIDs, has been sent as a response. Consequently, it is understood that the object information identified with the OID "a.5" has not been obtained. Accordingly, as shown in FIG. 9, the OID subsequent to the OID "a.2", which is recognized at this time, as well as any other OIDs thereafter will be deleted once, so that the object information for the OIDs after "a.2" will be newly stored in the next processing or later.

To describe a second example of the method used in the arrangement described above, as a result of a comparison between the list of OIDs generated based on the node-information storing unit 122 and the OIDs that have been sent as a response, if any of the OIDs that are stored in the node-information storing unit 122 has not been sent as a response, it is judged that the object identified with such an OID has been deleted from the monitoring target nodes $10_1$ to $10_n$. Accordingly the object information for the particular OID will be deleted from the node-information storing unit 122.

With this arrangement, it is possible to optimize the node-information storing unit 122 according to the state of the monitoring target nodes $10_1$ to $10_n$ at the particular point in time.

Figure 10:
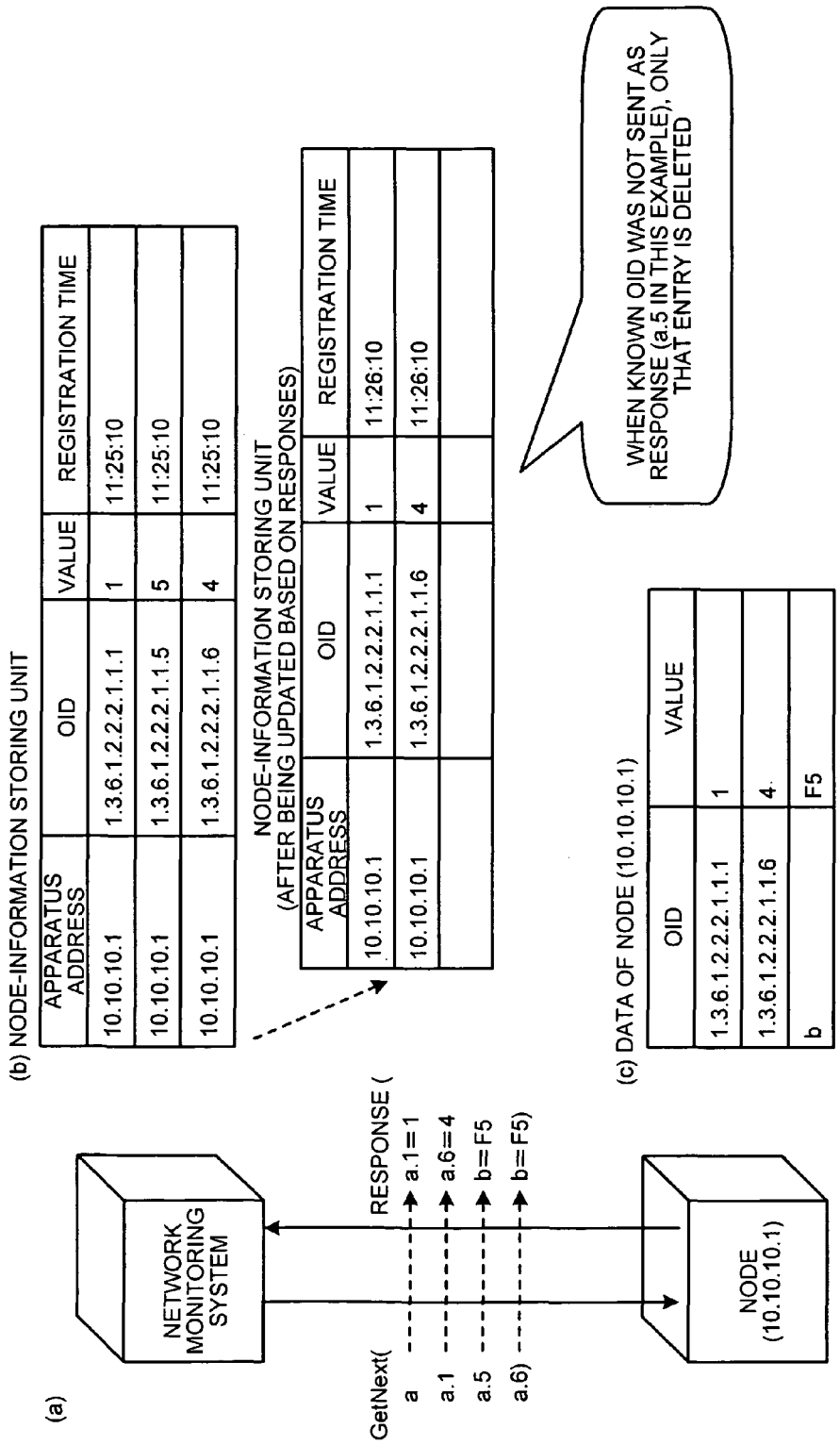
FIG. 10 is a schematic for explaining an update of the node-information storing unit when known node information is not responded.

FIG. 10 is a schematic for explaining an update of the node-information storing unit 122 when known node information is not responded. For example, when a GetNext command is sent to a node (of which the apparatus address is "10.10.10.1") having object information as shown in FIG. 10C, by specifying "a", "a.1", "a.5", and "a.6" (where "a"="1.3.6.1.2.2.2.1.1") out of a list of OIDs generated based on the node-information storing unit 122 shown in FIG. 10, the OIDs "a.1", "a.6", "b", and "b" will be sent as a response.

As we compare the OIDs sent as a response with the specified OIDs, it is observed that "a.5", which is included in the specified OIDs, has not been sent as a response. Consequently, it is judged that the object identified with the OID "a.5" has been deleted from the monitoring target node. Accordingly, as shown in FIG. 10, the object information identified with the OID "a.5" will be deleted.

As explained above, with the arrangements of the network monitoring apparatus 100 according to the first embodiment, when the command processing unit 123 obtains object information by collectively specifying a plurality of OIDs, if there is a discrepancy between the list of specified OIDs and the OIDs included in the obtained object information, the object information for the OID causing the discrepancy will be deleted from the node-information storing unit 122. Consequently, it is possible to optimize the object information stored in the node-information storing unit 122 and to collect the object information efficiently. Thus, it is possible to reduce the load to the monitoring target network and also to shorten the processing time required for the collection of the object information.

According to the first embodiment, the node-information storing unit 122 stores therein object information that has been obtained from the monitoring target nodes $10_1$ to $10_n$ in the past, by classifying the object information according to the OIDs. When the node-information collecting unit 110 regularly obtains object information from the monitoring target nodes $10_1$ to $10_n$ by specifying an OID, the OID-speculation-list generating unit 124 extracts an OID that includes the specified OID in the manner of a prefix search from the node-information storing unit 122. The command processing unit 123 obtains the object information by collectively specifying, at the same time, also the extracted OID. Consequently, the network monitoring apparatus 100 is able to reduce the number of times of communication made to the monitoring target nodes $10_1$ to $10_n$. Thus, it is possible to reduce the load to the monitoring target network and also to shorten the processing time required for the collection of the object information.

Furthermore, according to the first embodiment, the example in which the node-information collecting unit 110 sends a node-information collecting command by specifying a single OID has been explained; however, it is also possible to send a node-information collecting command by specifying a plurality of OIDs at a time. In the description of a second embodiment of the present invention, an example in which the node-information collecting unit 110 sends a node-information collecting command by specifying a plurality of OIDs will be explained.

Figure 11:
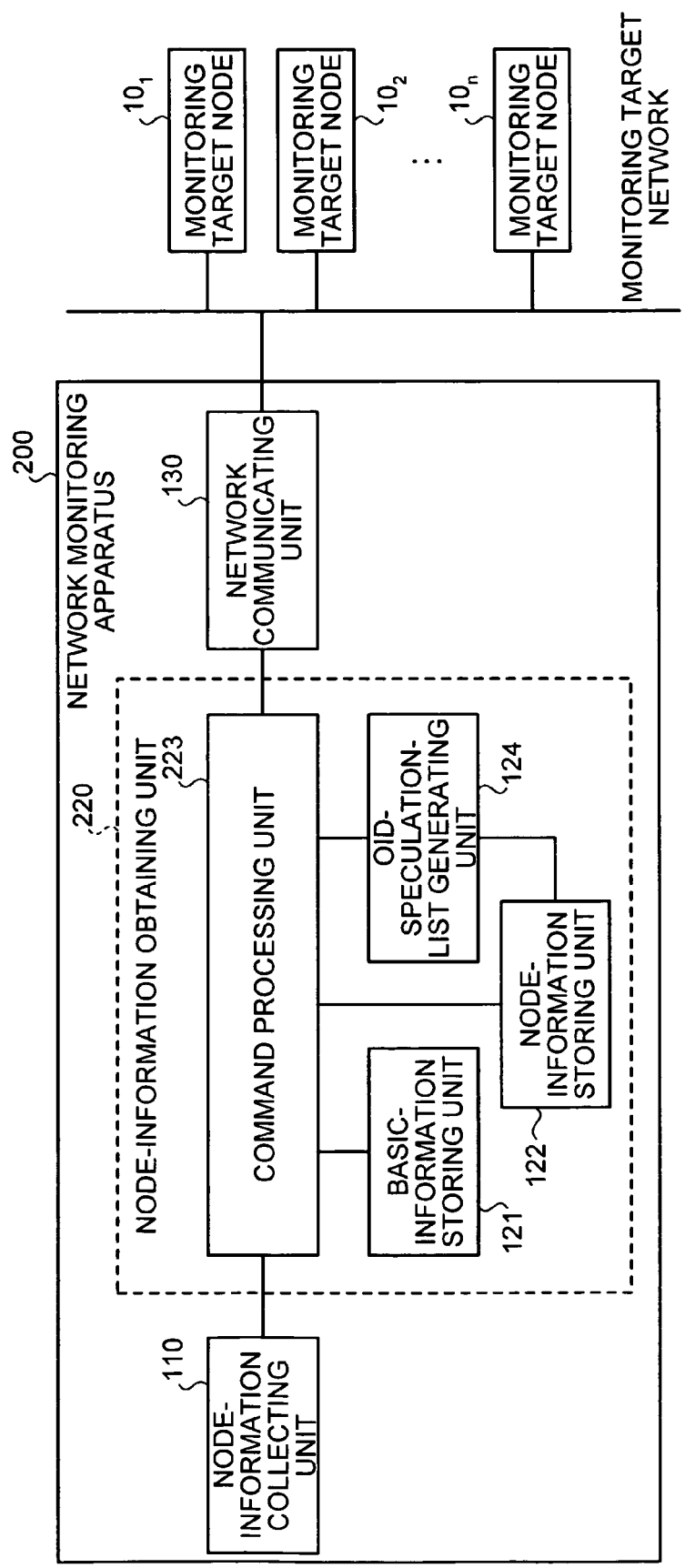
FIG. 11 is a block diagram of a network monitoring apparatus according to a second embodiment of the present invention.

FIG. 11 is a block diagram of a network monitoring apparatus 200 according to the second embodiment. For the sake of convenience of explanation, the functional elements that achieve the same functions as some of the constituent elements shown in FIG. 3 are indicated using the same reference characters as in FIG. 3, and explanation thereof will be omitted. As shown in FIG. 11, the network monitoring apparatus 200 is connected to the monitoring target nodes $10_1$ to $10_n$ via a monitoring target network.

The network monitoring apparatus 200 is an apparatus that regularly collects, using the SNMP, object information (node information) from the monitoring target nodes $10_1$ to $10_n$ that are connected to the monitoring target network, the object information indicating the state of each of the nodes, and also detects failures, if the network has any, by checking the attribute values included in the object information. The network monitoring apparatus 200 includes the node-information collecting unit 110, a node-information obtaining unit 220, and the network communicating unit 130.

The node-information obtaining unit 220 is a processing unit that sends, as a response, object information according to an information collecting command sent by the node-information collecting unit 110. The node-information obtaining unit 220 includes the basic-information storing unit 121, the node-information storing unit 122, a command processing unit 223, and the OID-speculation-list generating unit 124.

The command processing unit 223 is a processing unit that sends, as a response, object information according to an information collecting command sent by the node-information collecting unit 110. To be more specific, firstly, the command processing unit 223 obtains the aging period and the number of simultaneously-obtained objects from the basic-information storing unit 121. When having received the information collecting command from the node-information collecting unit 110, the command processing unit 223 extracts one of the plurality of specified OIDs and checks to see if the information of the object identified with the extracted OID is stored in the node-information storing unit 122.

When the object information in question is stored in the node-information storing unit 122, the command processing unit 223 calculates an elapsed period of time between the registration time of the object information and the current point in time, and when the calculated elapsed period of time is shorter than the aging period obtained from the basic-information storing unit 121, the command processing unit 223 stores therein the OID and the attribute value of the object information, as response data.

On the other hand, when the calculated elapsed period of time exceeds the aging period, the command processing unit 223 sends the specified apparatus address, the OID, and the number of simultaneously-obtained objects to the OID-speculation-list generating unit 124. In this case, the number of simultaneously-obtained objects is set as a number obtained by dividing the number of simultaneously-obtained objects obtained from the basic-information storing unit 121 by the number of OIDs requested. The command processing unit 223 then stores therein a list of OIDs, which is returned by the OID-speculation-list generating unit 124, as a request data.

Conversely, when the object information in question is not stored in the node-information storing unit 122, the command processing unit 223 stores the OID, as request data.

This processing described above is performed for each of the OIDs requested by the node-information collecting unit 110. The command processing unit 223 then sends a node-information collecting command to the network communicating unit 130 by specifying the request data accumulated as a result of the repeated processing. Subsequently, the command processing unit 223 stores object information, which is returned from the network communicating unit 130, into the node-information storing unit 122 and also adds the object information to the response data, before sending the entire response data to the node-information collecting unit 110.

FIG. 12 is a table of an example of data configuration of the node-information storing unit 122 according to the second embodiment. FIG. 13 is a table of an example of data configuration of the node-information storing unit 122 after an update according to the second embodiment. When the node-information collecting unit 110 specifies the OIDs "1.3.6.1.2.2.2.1.1" and "1.3.6.1.2.2.2.1.10" using a GetNext command, the OIDs "1.3.6.1.2.2.2.1.1.1", "1.3.6.1.2.2.2.1.1.2", "1.3.6.1.2.2.2.1.10.1", and "1.3.6.1.2.2.2.1.10.2" are stored as request data. When a Get-Next command is sent by specifying the request data, the object information for the OIDs "1.3.6.1.2.2.2.1.1.2", "1.3.6.1.2.2.2.1.1.3", "1.3.6.1.2.2.2.1.10.2", and "1.3.6.1.2.2.2.1.10.3", are obtained. The example in FIG. 13 shows the state after the result of this procedure is reflected onto the example shown in FIG. 12. In the example shown in FIG. 13, the registration times in the object information for the OIDs "1.3.6.1.2.2.2.1.1.2" and "1.3.6.1.2.2.2.1.10.2"

have been updated, and the object information for the OIDs "1.3.6.1.2.2.2.1.1.3" and "1.3.6.1.2.2.2.1.10.3" has been newly added.

Figure 14:
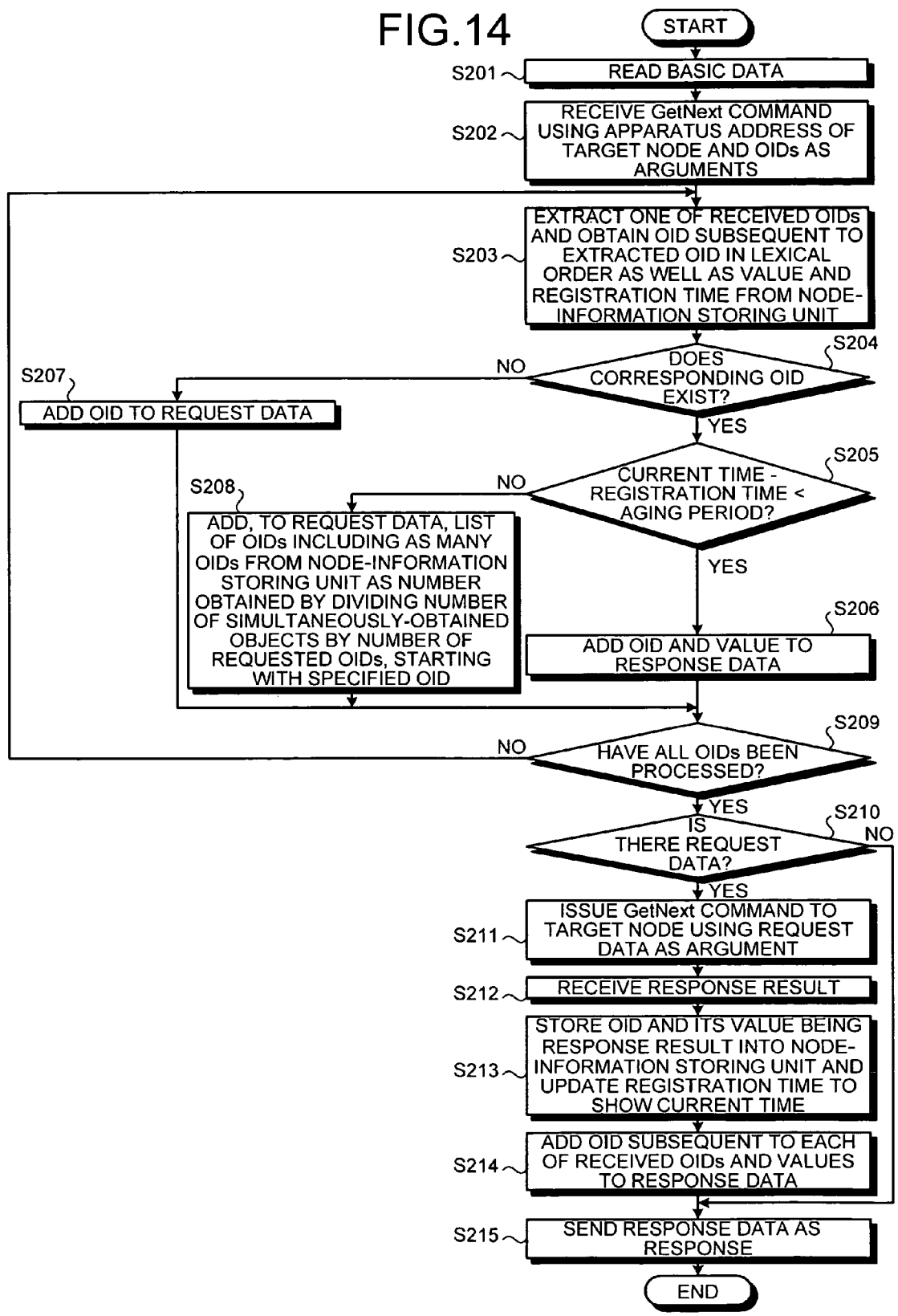
FIG. 14 is a flowchart of a processing procedure for a node-information collecting process performed by the network monitoring apparatus according to the second embodiment.

FIG. 14 is a flowchart of a processing procedure for a node-information collecting process performed by the network monitoring apparatus 200 according to the second embodiment. In the following section, an example in which a GetNext command is used as a node-information collecting command will be explained.

The command processing unit 223 firstly obtains the aging period and the number of simultaneously-obtained objects from the basic-information storing unit 121 (step S201). When the node-information collecting unit 110 sends an information collecting command, the command processing unit 223 receives the command (step S202), extracts one of the plurality of specified OIDs, and checks to see if the information of the object identified with the extracted OID is stored in the node-information storing unit 122 (step S203).

When the object information in question is stored in the node-information storing unit 122 (step S204: Yes), the command processing unit 223 calculates an elapsed period of time between the registration time of the object information and the current point in time. When the calculated elapsed period of time is shorter than the aging period obtained from the basic-information storing unit 121 (step S205: Yes), the command processing unit 223 stores therein the OID of the object information and an attribute value as response data (step S206).

When the calculated elapsed period of time is equal to or longer than the aging period (step S205: No), the command processing unit 223 sends the specified apparatus address, the OID, and the number of simultaneously-obtained objects to the OID-speculation-list generating unit 124. When the OID-speculation-list generating unit 124 generates a list of OIDs and returns the list of OIDs to the command processing unit 223, the command processing unit 223 stores therein the list of OIDs as request data (step S208).

When the object information in question is not stored in the node-information storing unit 122 (step S204: No), the command processing unit 223 stores therein the OID as request data (step S207).

This processing described above is performed for each of the OIDs sent by the node-information collecting unit 110 (step S209, step S210). The command processing unit 223 then sends a node-information collecting command to the network communicating unit 130 by specifying the request data accumulated as a result of the repeated processing (step S211). Subsequently, when the network communicating unit 130 returns object information (step S212), the command processing unit 223 stores the object information into the node-information storing unit 122 (step S213). The command processing unit 223 also adds the object information to the response data (step S214), before sending the entire response data to the node-information collecting unit 110 (step S215).

In the description of the second embodiment, the example has been explained in which the OID-speculation-list generating unit 124 extracts the OIDs from the node-information storing unit 122, using the number obtained by dividing the number of simultaneously-obtained objects obtained from the basic-information storing unit 121 by the number of OIDs requested by the node-information collecting unit 110 as the upper limit, and generates the list of OIDs; however, another arrangement is acceptable in which, when extracting OIDs, the OID-speculation-list generating unit 124 extracts OIDs by giving a higher priority to the OIDs that have more frequently been obtained than others in the past.

FIG. 15 is a table of an example of data configuration of the node-information storing unit 122 to which the number of times of reference is added, according to the second embodiment. In this example, as shown in the drawing, the number of times reference has been made is added to the object information stored in the node-information storing unit 122. The number of times reference has been made is counted up every time the object information is updated. The OID-speculation-list generating unit 124 extracts OIDs by giving a higher priority to the OIDs that have, as the number of times reference has been made, a larger number than others.

As explained above, with the arrangements of the network monitoring apparatus 200 according to the second embodiment, the node-information storing unit 122 further stores therein, for each of the pieces of object information, the number of times reference has been made indicating how many times each piece of object information has been obtained from the monitoring target nodes $10_1$ to $10_n$. The OID-speculation-list generating unit 124 extracts, from the node-information storing unit 122, OIDs by giving a higher priority to the OIDs that have, as the number of times reference has been made, a larger number than others. The command processing unit 223 obtains the object information by collectively specifying, at the same time, also the extracted OIDs. Thus, it is possible to reduce the number of times of communication made between the network monitoring apparatus 200 and the monitoring target nodes $10_1$ to $10_n$. Accordingly, it is possible to reduce the load to the monitoring target network and also to shorten the processing time required for the collection of the object information.

According to the second embodiment, when the node-information collecting unit 110 regularly obtains object information from the monitoring target nodes $10_1$ to $10_n$ by specifying a plurality of OIDs, the command processing unit 223 obtains the object information by collectively specifying, at the same time, also the OIDs that were specified subsequent to the specified OIDs in the past. Consequently, the network monitoring apparatus 200 is able to reduce the number of times of communication made to the monitoring target nodes $10_1$ to $10_n$. Thus, it is possible to reduce the load to the monitoring target network and also to shorten the processing time required for the collection of the object information.

According to the first and the second embodiments, the example in which, when the object information requested by the node-information collecting unit 110 is not stored in the node-information storing unit 122, each of the command processing units 123 and 223 obtains the object information from a corresponding one of the monitoring target nodes $10_1$ to $10_n$ is explained. In the following section, an example in which the OIDs "a" and "b" are in one level of the hierarchy, and the OIDs "a.1", "a.2", "a.3" . . . "b.1" "b.2" "b.3" . . . are the OIDs in the next level of the hierarchy, respectively, will be discussed. When the object information stored in the node-information storing unit 122 has some OIDs that change with an identical regularity, these OIDs are formed into one group in advance so that it is possible to speculate the changes of OIDs of the requested object information by referencing the changes of the OIDs belonging to the same group, and to collectively obtain the object information for the OIDs in the speculation from the corresponding one of the monitoring target nodes $10_1$ to $10_n$. In the description of a third embodiment of the present invention, an example will be explained in which OIDs that change in an identical manner are formed into a group in advance, so that the changes of the OIDs specified by the node-information collecting unit 110 are speculated, and also the object information for the OIDs in the speculation is collectively obtained.

Figure 16:
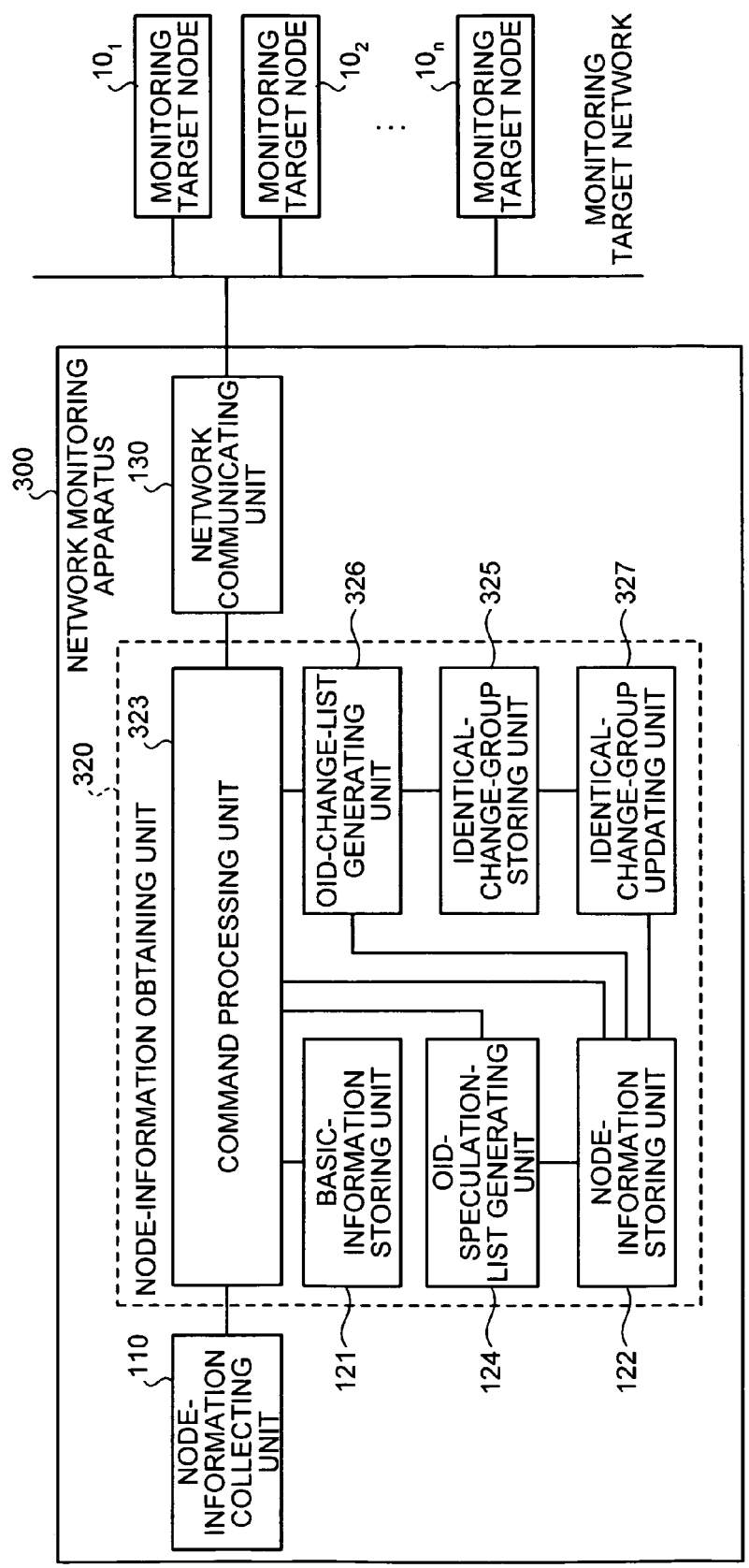
FIG. 16 is a block diagram of a network monitoring apparatus according to a third embodiment of the present invention.

FIG. 16 is a block diagram of a network monitoring apparatus 300 according to the third embodiment. For the sake of convenience of explanation, the functional elements that achieve the same functions as some of the constituent elements shown in FIGS. 3 and 11 are indicated using the same reference characters as in FIGS. 3 and 11, and explanation thereof will be omitted. As shown in FIG. 16, the network monitoring apparatus 300 is connected to the monitoring target nodes $10_1$ to $10_n$ via a monitoring target network.

The network monitoring apparatus 300 is an apparatus that regularly collects, using the SNMP, object information (node information) from the monitoring target nodes $10_1$ to $10_n$ that are connected to the monitoring target network, the object information indicating the state of each of the nodes, and also detects failures, if the network has any, by checking the attribute values included in the object information. The network monitoring apparatus 300 includes the node-information collecting unit 110, a node-information obtaining unit 320, and the network communicating unit 130.

The node-information obtaining unit 320 is a processing unit that sends, as a response, object information according to an information collecting command sent by the node-information collecting unit 110. The node-information obtaining unit 320 includes the basic-information storing unit 121, the node-information storing unit 122, a command processing unit 323, the OID-speculation-list generating unit 124, an identical-change-group storing unit 325, an OID-change-list generating unit 326, and an identical-change-group updating unit 327.

The command processing unit 323 is a processing unit that sends, as a response, the object information according to an information collecting command sent by the node-information collecting unit 110. To be more specific, firstly, the command processing unit 323 obtains the aging period and the number of simultaneously-obtained objects from the basic-information storing unit 121. When having received the information collecting command from the node-information collecting unit 110, the command processing unit 323 checks to see if information of the object identified with the specified OID is stored in the node-information storing unit 122.

When the object information in question is stored in the node-information storing unit 122, the command processing unit 323 calculates an elapsed period of time between the registration time of the object information and the current point in time, and when the calculated elapsed period of time is shorter than the aging period obtained from the basic-information storing unit 121, the command processing unit 323 sends the object information to the node-information collecting unit 110.

On the other hand, when the calculated elapsed period of time is equal to or longer than the aging period, the command processing unit 323 sends the specified apparatus address, the OID, and the number of simultaneously-obtained objects obtained from the basic-information storing unit 121, to the OID-speculation-list generating unit 124. The command processing unit 323 then sends a node-information collecting command to the network communicating unit 130 by specifying the list of OIDs returned from the OID-speculation-list generating unit 124. Subsequently, when object information is returned form the network communicating unit 130, the command processing unit 323 stores the returned object information into the node-information storing unit 122 and also sends the object information that corresponds to the requested OID to the node-information collecting unit 110.

When the object information in question is not stored in the node-information storing unit 122, the command processing unit 323 sends the OID and the number of simultaneously-obtained objects obtained from the basic-information storing unit 121 to the OID-change-list generating unit 326. When having received the OID and the number of simultaneously-obtained objects, the OID-change-list generating unit 326 generates a list in which changes of the OIDs are speculated, and returns the generated list to the command processing unit 323. The processing performed by the OID-change-list generating unit 326 will be described later.

When having received the list in which changes of the OIDs are speculated from the OID-change-list generating unit 326, the command processing unit 323 sends a node-information collecting command to the network communicating unit 130 by specifying all the OIDs included in the list. Subsequently, when object information is returned from the network communicating unit 130, the command processing unit 323 stores the returned object information into the node-information storing unit 122 and also sends the object information that corresponds to the requested OID to the node-information collecting unit 110.

The identical-change-group storing unit 325 is a storing unit that stores therein identical change group information in which OIDs that change with an identical regularity are formed into a group, the regularity being, for example "a.1", "a.2", "a.3" ... "b.1" "b.2" "b.3" .... FIG. 17 is a table of an example of data configuration of the identical-change-group storing unit 325 according to the third embodiment. As shown in the drawing, the identical-change-group storing unit 325 stores therein OIDs that change with an identical regularity while classifying them using a group ID.

The OID-change-list generating unit 326 is a processing unit that generates a list in which changes of the OID are speculated, according to an OID and the number of simultaneously-obtained objects received from the command processing unit 323. To be more specific, when having received the OID and the number of simultaneously-obtained objects from the command processing unit 323, the OID-change-list generating unit 326 references the identical-change-group storing unit 325 and obtains all the OIDs that belong to the same group as the received OID. The OID-change-list generating unit 326 then extracts an OID out of the obtained OIDs by selecting an OID that is included in the largest number of pieces of object information stored in the node-information storing unit 122. The OID-change-list generating unit 326 generates the list in which changes of the OID received from the command processing unit 323 are speculated, based on the changes of the extracted OID and sends the generated list to the command processing unit 323.

An example will be explained using the node-information storing unit 122 shown in FIG. 13 and the identical-change-group storing unit 325 shown in FIG. 17. When having received the OID "1.3.6.1.2.1.4.20.1" from the command processing unit 323, the OID-change-list generating unit 326 references the identical-change-group storing unit 325 at first, and obtains the OIDs "1.3.6.1.2.2.2.1.1." and "1.3.6.1.2.1.10.23.1.1.1." that belong to the same group as the received OID.

The OID-change-list generating unit 326 then references the node-information storing unit 122 based on these OIDs and obtains the OIDs "1.3.6.1.2.2.2.1.1.1", "1.3.6.1.2.2.2.1.1.2", and "1.3.6.1.2.2.2.1.1.3" each of which includes the OID "1.3.6.1.2.2.2.1.1". Hypothetically, if the node-information storing unit 122 stored therein four OIDs each of which includes "1.3.6.1.2.1.10.23.1.1.1.", the OID-change-list generating unit 326 would obtain these four OIDs.

Subsequently, the OID-change-list generating unit 326 compares the obtained OIDs, namely "1.3.6.1.2.2.2.1.1.1", "1.3.6.1.2.2.2.1.1.2", and "1.3.6.1.2.2.2.1.1.3", with the OID "1.3.6.1.2.2.2.1.1" obtained from the identical-change-group storing unit 325 to check for any discrepancy and to understand how the OIDs have changed. In this example, it is understood that the changes causing the discrepancy is {1, 2, 3}. From the understanding of these changes and the OID "1.3.6.1.2.1.4.20.1" received from the command processing unit 323, the OID-change-list generating unit 326 generates a list in which the changes of the OIDs are speculated with the OIDs "1.3.6.1.2.1.4.20.1.1", "1.3.6.1.2.1.4.20.2", and "1.3.6.1.2.1.4.20.3" and returns the generated list to the command processing unit 323.

The identical-change-group updating unit 327 is a processing unit that updates the identical change group information stored in the identical-change-group storing unit 325, based on the object information stored in the node-information storing unit 122. To be more specific, the identical-change-group updating unit 327 reads a piece of object information out of the node-information storing unit 122 at a predetermined time and extracts, out of another piece of object information, an OID that has the largest number of digits in common with the OID of the read piece of object information, in the manner of a prefix search. The identical-change-group updating unit 327 then stores therein the OID having the portion in common in the manner of a prefix search and a list of portions that are not in common so that they are in correspondence with one another.

The identical-change-group updating unit 327 performs the processing described above for each of all the pieces of object information stored in the node-information storing unit 122. The identical-change-group updating unit 327 forms OIDs into groups by comparing the OIDs having been stored as a result of the sequence of processing and also organizing the OIDs so that the list of portions that are not in common is arranged with identical regularities. The identical-change-group updating unit 327 brings these OIDs formed into groups into correspondence with group IDs that are serial numbers assigned to the groups starting with "1" and stores the groups with the group IDs into the identical-change-group storing unit 325. At this time, all of the information for the OIDs that have already been registered will be deleted and replaced with the information for the new OIDs.

For example, the node-information storing unit 122 shown in FIG. 13 stores therein two OIDs "1.3.6.1.2.2.2.1.1", "1.3.6.1.2.2.2.1.10" as well as OIDs obtained by adding 1, 2, or 3 to each of them respectively. Accordingly, these two OIDs are classified into one group.

FIG. 18 is a table of an example of data configuration of the node-information storing unit 122 after an update according to the third embodiment. In the example shown in this drawing, when the node-information collecting unit 110 specifies the OID "1.3.6.1.2.1.4.20.1", with reference to the identical-change-group storing unit 325 shown in FIG. 17, a list of OIDs is generated based on the changes of the OID "1.3.6.1.2.2.2.1.1", which belongs to the same group as the specified OID, so that a node-information collecting command is sent. As a result, the object information for the OIDs "1.3.6.1.2.1.4.20.1.1", "1.3.6.1.2.1.4.20.1.2", and "1.3.6.1.2.1.4.20.1.3" are obtained. The example in FIG. 18 shows the state after the result of this procedure is reflected onto the example shown in FIG. 13. In the example shown in FIG. 18, the object information for the OIDs "1.3.6.1.2.1.4.20.1.1" and "1.3.6.1.2.1.4.20.1.2" "1.3.6.1.2.1.4.20.1.3" has been newly added.

As explained above, with the arrangements of the network monitoring apparatus 300 according to the third embodiment, the identical-change-group updating unit 327 updates the identical change group information stored in the identical-change-group storing unit 325 by forming the OIDs of the object information stored in the node-information storing unit 122 into groups based on the assignment pattern of each of the OIDs. Accordingly, it is possible to optimize the identical change group information automatically and to collect object information efficiently. Thus, it is possible to reduce the load to the monitoring target network and also to shorten the processing time required for the collection of the object information.

According to the third embodiment, the identical-change-group storing unit 325 stores therein the identical change group information obtained by forming the OIDs into groups based on the assignment patterns. When the node-information collecting unit 110 regularly obtains object information from the monitoring target nodes $10_1$ to $10_n$ by specifying an OID, the OID-change-list generating unit 326 obtains an OID that has the same assignment pattern as the specified OID, from the identical-change-group storing unit 325, extracts the change portion of the obtained OID out of the object information stored in the node-information storing unit 122, and generates a new OID by connecting the extracted change portion and the specified attribute identifier together. Because the command processing unit 323 obtains the object information by collectively specifying, at the same time, also the generated attribute identifier, the network monitoring apparatus 300 is able to reduce the number of times of communication made to the monitoring target nodes $10_1$ to $10_n$. Thus, it is possible to reduce the load to the monitoring target network and also to shorten the processing time required for the collection of the object information.

According to the first to the third embodiments, the examples with the network monitoring apparatuses are explained. However, it is also possible to obtain a network monitoring program having the same functions by realizing the configurations of the network monitoring apparatuses with software. Next, an example of a computer that executes such a network monitoring program will be explained.

Figure 19:
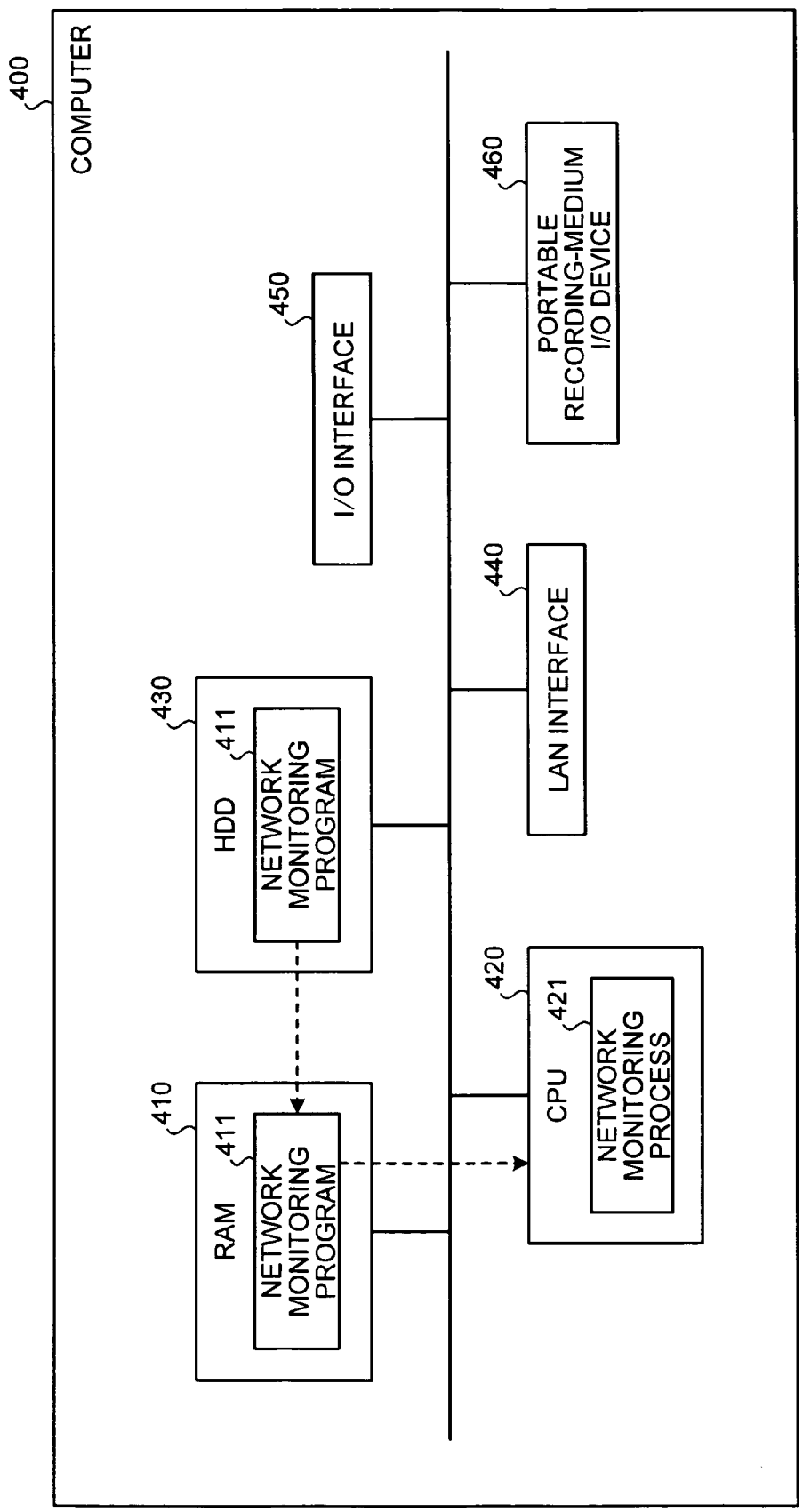
FIG. 19 is a block diagram of a computer that executes a network monitoring program according to the first to the third embodiments.
Figure 21:
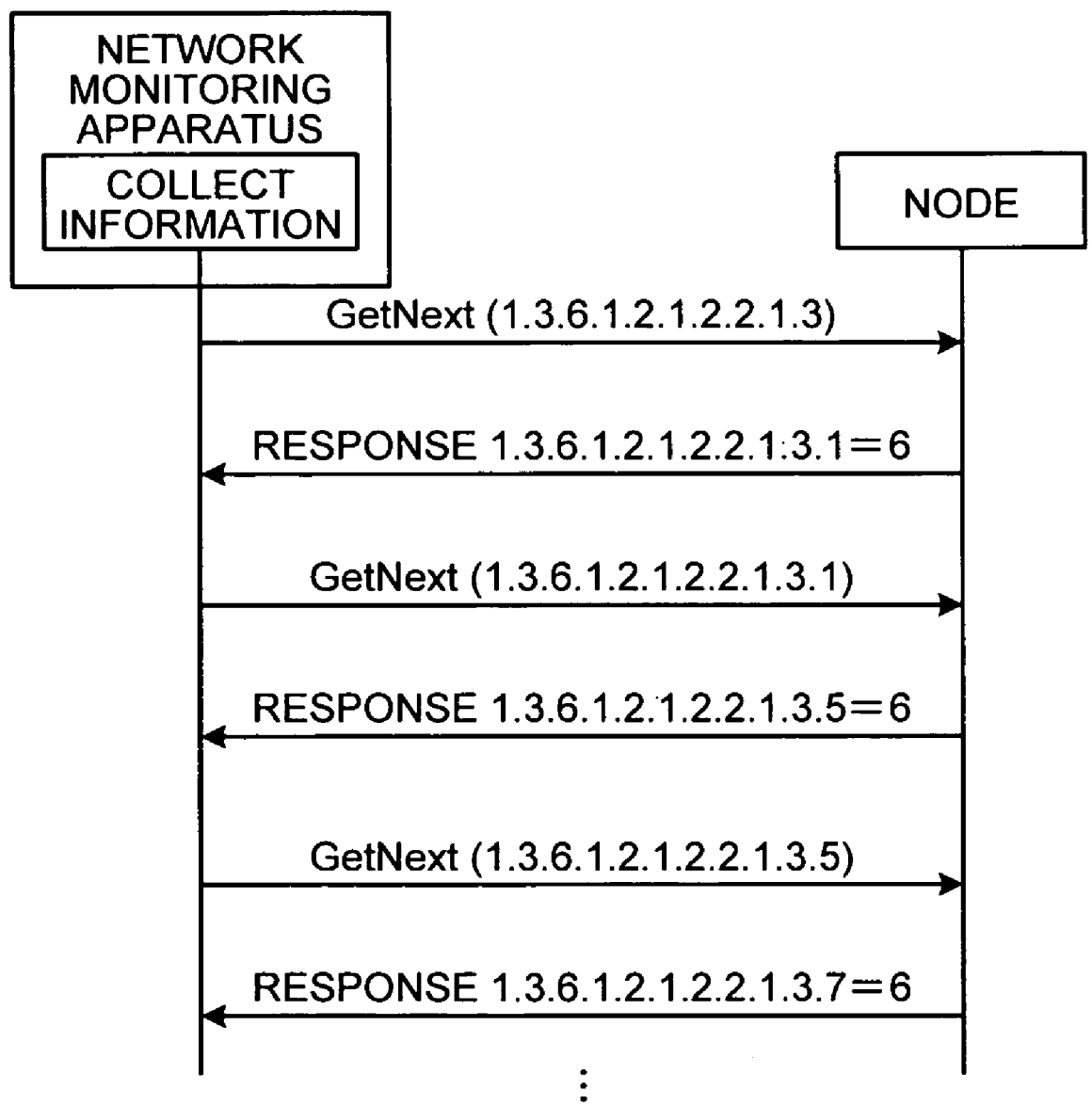
FIG. 21 is a schematic for explaining a node-information collecting method used in a network monitoring system according to the conventional technology.

FIG. 19 is a block diagram of a computer 400 that executes a network monitoring program according to the first to the third embodiments. As shown in the drawing, the computer 400 includes a random access memory (RAM) 410, a central processing unit (CPU) 420, a hard disk drive (HDD) 430, a local-area-network (LAN) interface 440, an input/output (I/O) interface 450, and a portable recording-medium input/output (I/O) device 460.

The RAM 410 is a memory that stores therein programs and results of the programs in the execution process. The CPU 420 is a central processing unit that reads a program from the RAM 410 and executes the program.

The HDD 430 is a disc device that stores therein programs and data. The LAN interface 440 is an interface for connecting the computer 400 to other computers via a LAN.

The I/O interface 450 is an interface to which an input device like a mouse or a keyboard or a display device can be connected. The portable recording-medium I/O device 460 is a device, such as a digital versatile disc (DVD) drive, which reads and writes data to and from a portable recording-medium.

A network monitoring program 411 executed by the computer 400 is recorded on a portable recording-medium such as a DVD, read from the portable recording-medium by the portable recording-medium I/O device 460 such as a DVD drive, and installed on the computer 400.

Alternatively, the network monitoring program 411 may be stored in a database in another computer system connected to the computer 400 via the LAN interface 440, read from the data base, and installed on the computer 400.

The network monitoring program 411 being installed is stored in the HDD 430, read into the RAM 410, and executed by the CPU 420 as a network monitoring process 421.

According to an embodiment of the present invention, it is possible to achieve an effect where the load to the monitoring target network is reduced and also the processing time required for the collection of the attribute information is shortened.

Furthermore, according to an embodiment of the present invention, it is possible to reduce the number of times of communication made to the monitoring target information processing apparatus. Thus, it is possible to achieve an effect where the load to the monitoring target network is reduced and also the processing time required for the collection of the attribute information is shortened.

Moreover, according to an embodiment of the present invention, it is possible to optimize the identical change attribute information automatically and to collect the attribute information efficiently. Thus, it is possible to achieve an effect where the load to the monitoring target network is reduced and also the processing time required for the collection of the attribute information is shortened.

Furthermore, according to an embodiment of the present invention, it is possible to eliminate the unnecessary processing to try to obtain attribute information that is not held by the monitoring target information processing apparatus. Thus, it is possible to achieve an effect where the load to the monitoring target network is reduced and also the processing time required for the collection of the attribute information is shortened.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for collecting attribute information of an information processing apparatus to be monitored in a system for monitoring the information processing apparatus via a network, the apparatus comprising:
    an attribute-information storing unit that stores attribute information obtained from the information processing apparatus and attribute identifiers corresponding to the attribute information, each of the attribute identifiers including a first identifier indicating a type of the attribute identifier and a second identifier uniquely assigned within the type;
    a receiving unit that receives an attribute information request for a first one of the attribute identifiers;
    a determining unit that determines whether the attribute information corresponding to the first attribute identifier is stored in the attribute-information storing unit for more than a predetermined period of time; and
    an attribute-identifier generating unit that extracts second attribute identifiers of the attribute identifiers, with the second attribute identifiers including the first identifier most frequently appearing in the attribute identifiers stored in the attribute-information storing unit, the second attribute identifiers belonging to a group to which the first attribute identifier belongs, the group storing the first identifier of the attribute identifier whose second identifier changes with an identical regularity, when the determining unit determines that the attribute information corresponding to the first attribute identifier is stored for more than the predetermined period of time and
    the attribute-identifier generating unit further generates new attribute identifiers, each including the first identifier of the first attribute identifier and each of the second identifiers of the second attribute identifiers;
    wherein at least one of the attribute-information storing unit, the receiving unit, the determining unit, and the attribute-identifier generating unit is to be implemented by a processor.

2. The apparatus according to claim 1, further comprising:
    an obtaining unit that regularly obtains the attribute information from the information processing apparatus to be monitored by specifying the first attribute identifier, and when obtaining the attribute information, collectively specifies a subsequent attribute identifier that was specified subsequent to the first attribute identifier in past times.

3. The apparatus according to claim 2, wherein the obtaining unit regularly obtains the attribute information from the information processing apparatus to be monitored by specifying a plurality of the first attribute identifiers, and when obtaining the attribute information, collectively specifies subsequent attribute identifiers that were specified subsequent to the first attribute identifiers in past times.

4. The apparatus according to claim 2, wherein
    the attribute-information storing unit that stores the attribute information that were obtained from the information processing apparatus to be monitored in past times, for each of the specified attribute identifiers,
    each of the specified attribute identifiers is defined by the first identifier linked with the second identifier, and
    the obtaining unit regularly obtains the attribute information from the information processing apparatus to be monitored by specifying the first attribute identifier, and when obtaining the attribute information, extracts a third attribute identifier that includes the first identifier from the attribute identifier stored in the attribute-information storing unit, and collectively specifies the extracted third attribute identifier.

5. The apparatus according to claim 4, wherein
    the attribute-information storing unit further stores a number indicating how many times the attribute information has been obtained from the information processing apparatus, for each of the stored attribute information, and
    when obtaining the attribute information, the obtaining unit extracts the third attribute identifier in order of the number.

6. The apparatus according to claim 4, further comprising:
    an identical-change attribute-information storing unit that stores identical change attribute identifiers in which first identifiers of the attribute identifiers are formed into groups based on a pattern of assigning second identifiers, wherein
    when obtaining the attribute information, the receiving unit receives an attribute identifier that includes the first identifier with an identical pattern of assigning the second identifier out of the identical change attribute identifiers stored in the identical-change attribute-information storing unit, extracts a second identifier of the received attribute identifier from the attribute identifier stored in the attribute-information storing unit, generates a new attribute identifier by linking the extracted second identifier and the first identifier together, and collectively specifies the new attribute identifier.

7. The apparatus according to claim 6, further comprising:
    an identical-change attribute-information updating unit that updates the identical change attribute identifiers stored in the identical-change attribute-information storing unit by grouping the attribute identifiers corresponding to the attribute information stored in the attribute-information storing unit based on the pattern of assigning the second identifiers.

8. The apparatus according to claim 4, wherein
the obtaining unit includes an attribute-information deleting unit that deletes, upon receiving an error indicating that a specified attribute identifier does not exist from the information processing apparatus to be monitored as a response to an attempt to receive the attribute information by specifying the attribute identifier, the attribute information corresponding to the specified attribute identifier from the attribute information stored in the attribute-information storing unit.

9. The apparatus according to claim 2, wherein
upon receiving an error indicating that there are too many pieces of attribute information being in response from the information processing apparatus to be monitored as a response to an attempt to obtain the attribute information by collectively specifying a plurality of attribute identifiers, the obtaining unit makes an attempt to obtain the attribute information from the information processing apparatus to be monitored by specifying reducing number of attribute identifiers to collectively specify.

10. The apparatus according to claim 4, wherein
the obtaining unit includes an attribute-information deleting unit that deletes, when there is a discrepancy between the specified attribute identifiers and attribute identifiers included in the obtained attribute information as a result of obtaining the attribute information by collectively specifying a plurality of attribute identifiers, the attribute information corresponding to the attribute identifier having the discrepancy from the attribute information stored in the attribute-information storing unit.

11. A method of collecting attribute information of an information processing apparatus to be monitored in a system for monitoring the information processing apparatus via a network, the method comprising:
storing an attribute information obtained from the information processing apparatus and attribute identifiers corresponding to the attribute information, the attribute identifier including a first identifier indicating a type of the attribute identifier and a second identifier uniquely assigned within the type;
receiving an attribute information request for a first one of the attribute identifiers;
determining whether the attribute information corresponding to the first attribute identifier is stored by the storing for more than a predetermined period of time;
extracting second attribute identifiers of the attribute identifiers, with the second attribute identifiers including the first identifier most frequently appearing in the attribute identifiers stored at the storing and belonging to a group to which the first attribute identifier belongs, the group storing the first identifier of the attribute identifier whose second identifier changes with an identical regularity, when the determining determines that the attribute information corresponding to the first attribute identifier is stored for more than the predetermined period of time; and
generating new attribute identifiers, each including the first identifier of the first attribute identifier and each of the second identifiers of the second attribute identifiers;
wherein at least one of the storing, receiving, determining, extracting, and generating is to be executed by a processor.

12. The method according to claim 11, further comprising:
obtaining regularly the attribute information from the information processing apparatus to be monitored; and
specifying collectively, when obtaining the attribute information, a subsequent attribute identifier that was specified subsequent to the first attribute identifier in past times.

13. The method according to claim 12, wherein the obtaining includes
obtaining regularly the attribute information from the information processing apparatus to be monitored by specifying a plurality of the first attribute identifiers; and
the specifying includes specifying collectively, when obtaining the attribute information, subsequent attribute identifiers that were specified subsequent to the first attribute identifiers in past times.

14. The method according to claim 12, further comprising:
storing the attribute information that were obtained from the information processing apparatus to be monitored in past times, for each attribute identifier, wherein the attribute identifier is defined by the first identifier linked with the second Identifier, and
the obtaining includes
obtaining regularly the attribute information from the information processing apparatus to be monitored by specifying the first attribute identifier;
extracting, when obtaining the attribute information, a third attribute identifier that includes the first attribute identifier from the attribute information at the storing; and
specifying collectively the extracted third attribute identifier.

15. The method according to claim 14, wherein
the storing includes storing a number indicating how many times the attribute information has been obtained from the information processing apparatus, for each of the stored attribute information, and
the obtaining includes extracting, when obtaining the attribute information, the third attribute identifier in order of the number.

16. A computer-readable, non-transitory recording medium that stores a computer program for collecting attribute information of an information processing apparatus to be monitored in a system for monitoring the information processing apparatus via a network,
the computer program causing a computer to execute:
storing attribute information obtained from the information processing apparatus and attribute identifiers corresponding to the attribute information, the attribute identifier including a first identifier indicating a type of the attribute identifier and a second identifier uniquely assigned within the type;
receiving an attribute information request for a first one of the attribute identifiers;
determining whether the attribute information corresponding to the first attribute identifier is stored at the storing for more than a predetermined period of time;
extracting second attribute identifiers of the attribute identifiers, with the second attribute identifiers including the first identifier most frequently appearing in the attribute identifiers stored by the storing and belonging to a group to which the first attribute identifier belongs, the group storing the first identifier of the attribute identifier whose second identifier changes with an identical regularity, when the determining determines that the attribute information corresponding to the first attribute identifier is stored for more than the predetermined period of time; and generating new attribute identifiers, each including the first identifier of the first attribute identifier and each of the second identifiers of the second attribute identifiers.

17. The computer-readable non-transitory recording medium according to claim 16, further comprising:

obtaining regularly the attribute information from the information processing apparatus to be monitored; and specifying collectively, when obtaining the attribute information, a second attribute identifier that was specified subsequent to the first attribute identifier in past times.

18. The computer-readable non-transitory recording medium according to claim 17, wherein the obtaining includes obtaining regularly the attribute information from the information processing apparatus to be monitored by specifying a plurality of first attribute identifiers; and specifying collectively, when obtaining the attribute information, second attribute identifiers that were specified subsequent to the first attribute identifiers in past times.

19. The computer-readable non-transitory recording medium according to claim 17, further comprising:

storing the attribute information that were obtained from the information processing apparatus to be monitored in past times, for each attribute identifier, wherein the attribute identifier is defined by the first identifier linked with the second identifier, and the obtaining includes obtaining regularly the attribute information from the information processing apparatus to be monitored by specifying the first attribute identifier;

extracting, when obtaining the attribute information, a third attribute identifier that includes the first attribute identifier from the attribute information at the storing; and specifying collectively the extracted third attribute identifier.

20. The computer-readable non-transitory recording medium according to claim 19, wherein the storing includes storing a number indicating how many times the attribute information has been obtained from the information processing apparatus, for each of the stored attribute information, and the obtaining includes extracting, when obtaining the attribute information, the third attribute identifier in order of the number.

* * * * *